(12) United States Patent
Campos Macias et al.

(10) Patent No.: US 11,886,968 B2
(45) Date of Patent: Jan. 30, 2024

(54) METHODS AND DEVICES FOR DETECTING OBJECTS AND CALCULATING A TIME TO CONTACT IN AUTONOMOUS DRIVING SYSTEMS

(71) Applicant: INTEL CORPORATION, Santa Clara, CA (US)

(72) Inventors: Leobardo Emmanuel Campos Macias, Guadalajara (MX); Rafael de la Guardia Gonzalez, Guadalajara (MX); Anthony Kyung Guzman Leguel, Guadalajara (MX); David Gomez Gutierrez, Tlaquepaque (MX); Jose Ignacio Parra Vilchis, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 451 days.

(21) Appl. No.: 16/831,896

(22) Filed: Mar. 27, 2020

(65) Prior Publication Data

US 2020/0223434 A1 Jul. 16, 2020

(51) Int. Cl.
*G06N 20/20* (2019.01)
*B60W 30/095* (2012.01)
(Continued)

(52) U.S. Cl.
CPC ......... *G06N 20/20* (2019.01); *B60W 30/0956* (2013.01); *G06N 3/04* (2013.01);
(Continued)

(58) Field of Classification Search
CPC ........... G06T 7/13; G06T 7/143; G06T 7/149; G06T 7/194; G06T 7/521; G06T 7/74;
(Continued)

(56) References Cited

U.S. PATENT DOCUMENTS

2009/0192710 A1* 7/2009 Eidehall ............ B60W 50/0097
701/300
2009/0295917 A1* 12/2009 Zhang .................. G06V 20/588
345/589

(Continued)

FOREIGN PATENT DOCUMENTS

CN 109146929 A 1/2019

OTHER PUBLICATIONS

Photoelectric_effect___article___Photons___Khan_Academy.pdf (Year: 2016).*

(Continued)

*Primary Examiner* — Thomas Ingram
*Assistant Examiner* — Faris Asim Shaikh
(74) *Attorney, Agent, or Firm* — VIERING, JENTSCHURA & PARTNER mbB

(57) ABSTRACT

A method for calculating a time to contact of an autonomous vehicle, the method comprising: obtaining a plurality of event data an image, wherein the event data is associated with a pixel associated with a change in light intensity; determining a reference signal frequency associated with a transmitted light; identifying a select event data from the plurality of event data, wherein the light frequency associated with the select event data is substantially the same as the reference signal frequency; determining an object based on the select event data, wherein the object is fully enclosed by a bounding box comprising coordinates of a rectangular border; calculating a distance between a set of coordinates of the bounding box closest to the autonomous vehicle and the autonomous vehicle; and calculating the time to contact between the set of coordinates of the bounding box and the autonomous vehicle.

16 Claims, 19 Drawing Sheets

(51) Int. Cl.
    *G06N 3/04* (2023.01)
    *G06V 10/141* (2022.01)
    *G06V 10/764* (2022.01)
    *G06V 10/147* (2022.01)
    *G06V 20/56* (2022.01)

(52) U.S. Cl.
    CPC .......... *G06V 10/141* (2022.01); *G06V 10/147* (2022.01); *G06V 10/764* (2022.01); *G06V 20/56* (2022.01); *B60W 2420/52* (2013.01)

(58) Field of Classification Search
    CPC ....... G06T 1/00; G06T 1/0007; G06T 1/0014; G06T 1/60; G06T 3/0031; G06T 17/20; G06T 2200/00; G06T 2207/00; G06T 2207/30241; G06T 2207/30261; G06T 2207/30264; B60W 30/0956; B60W 2420/52; B60W 2420/42; B60W 30/095; B60W 50/00; B60W 60/001; B60W 60/0016; B60W 60/0059; B60W 2050/0005; B60W 2050/0052; G06N 3/04; G06N 3/0427; G06N 3/0454; G06N 5/003; G06N 7/005; G06N 20/20; G06K 9/6273; G06V 10/141; G06V 10/147; G06V 20/56
    See application file for complete search history.

(56) References Cited

U.S. PATENT DOCUMENTS

| | | | | |
|---|---|---|---|---|
| 2016/0042621 | A1* | 2/2016 | Hogg | H04N 23/64 348/155 |
| 2018/0173992 | A1* | 6/2018 | Zink | G06T 7/246 |
| 2018/0240249 | A1* | 8/2018 | Uchigaito | G06V 40/10 |
| 2019/0208113 | A1* | 7/2019 | Sandstrom | G01S 17/36 |
| 2019/0286938 | A1* | 9/2019 | Backhus | G06F 18/214 |
| 2019/0286942 | A1* | 9/2019 | Abhiram | G06F 18/2148 |
| 2019/0291723 | A1 | 9/2019 | Srivatsa et al. | |
| 2020/0011668 | A1* | 1/2020 | Derhy | G06V 20/56 |
| 2020/0225325 | A1* | 7/2020 | Kim | G01S 7/487 |
| 2020/0344451 | A1* | 10/2020 | Kindo | H04N 23/80 |
| 2021/0018596 | A1* | 1/2021 | Chung | G01S 7/4876 |

OTHER PUBLICATIONS

Enterprise_ai-cnns_vs_rnns-f.pdf (Year: 2020).*
36.5A___Light_-_Biology_LibreTexts.pdf (Year: 2018).*
Anonymus, Event camera, Wikipedia, Mar. 16, 2020, 4 pages, URL: https://en.wikipedia.org/w/index.php?title=Event_camera&oldid=945846947.
Zhu et al., The Multi Vehicle Stereo Event Camera Dataset: An Event Camera Dataset for 3D Perception, IEEE Robotics and Automation Letters, Jan. 2018, 8 pages.
Wang et al., Temporal Pulses Driven Spiking Neural Network for Fast Object Recognition in Autonomous Driving, Jan. 2020, 7 pages.
Zhang et al., Vehicle Detection Based on LiDAR and Camera Fusion, 17th International IEEE Conference on Intelligent Transportation Systems (ITSC), IEEE, Oct. 8-11, 2014, Qingdao, China.
European Search Report issued for the corresponding European Patent Application No. 20204635.5, dated May 4, 2021, 10 pages (Informational purposes only).
Brooks, "The Big Problem With Self-Driving Cars Is People", IEEE Spectrum, accessed Mar. 14, 2019, https://spectrum.ieee.org/transportation/self-driving/the-big-problem-with-selfdriving-cars-is-people, 6 pages.
Fairley, "The Self-Driving Car's Bicycle Problem", IEEE Spectrum, accessed Mar. 14, 2019, https://spectrum.ieee.org/cars-that-think/transportation/self-driving/the-selfdriving-cars-bicycle-problem, 3 pages.
Yuan et al., "Adversarial Examples: Attacks and Defenses for Deep Learning", Dec. 9, 2017, pp. 1-22, arXiv, Cornell University, New York.
Akhtar et al., "Threat of Adversarial Attacks on Deep Learning in Computer Vision: A Survey", Journal of Latex Class Files, Jan. 4, 2018, pp. 1-20, vol. PP.
Chen, "Pseudo-labels for Supervised Learning on Dynamic Vision Sensor Data, Applied to Object Detection under Ego-motion", CVPR, Mar. 14, 2018, pp. 1-9.
Brandli et al., "A 240×180 130 db 3 US latency global shutter spatiotemporal vision sensor", IEEE Journal of Solid-State Circuits, Oct. 2014, pp. 2333-2341, vol. 49, No. 10.
Pan et al., "Bringing a blurry frame alive at high frame-rate with an event camera", Proceedings of the IEEE Conference on Computer Vision and Pattern Recognition, 2019, pp. 6820-6829, Computer Vision Foundation.
Browning et al., "Visual Navigation in a Cluttered World", Chapter 18, Oct. 28, 2017, https://doi.org/10.1002/9783527680863.ch18, 22 pages.
Schaub et al., "Reactive obstacle avoidance for highly maneuverable vehicles based on a two-stage optical flow clustering", IEEE Transactions on Intelligent Transportation Systems, Aug. 2017, pp. 2137-2152, vol. 18, No. 8.
Ramos et al., "Detecting unexpected obstacles for self-driving cars: Fusing deep learning and geometric modeling", IEEE Intelligent Vehicles Symposium (IV), Jun. 2017, pp. 1025-1032, IEEE.
Manderscheid et al., "Speed invariant time surface for learning to detect corner points with event-based cameras", Proceedings of the IEEE Conference on Computer Vision and Pattern Recognition, Apr. 30, 2019, pp. 10245-10254.
Ren et al., "Faster R-CNN: Towards Real-Time Object Detection with Region Proposal Networks", Jan. 6, 2016, pp. 1-14, arXiv, Cornell University, New York.
Jaderberg et al., "Spatial Transformer Networks", Feb. 4, 2016, pp. 1-15, arXiv, Cornell University, New York.

* cited by examiner

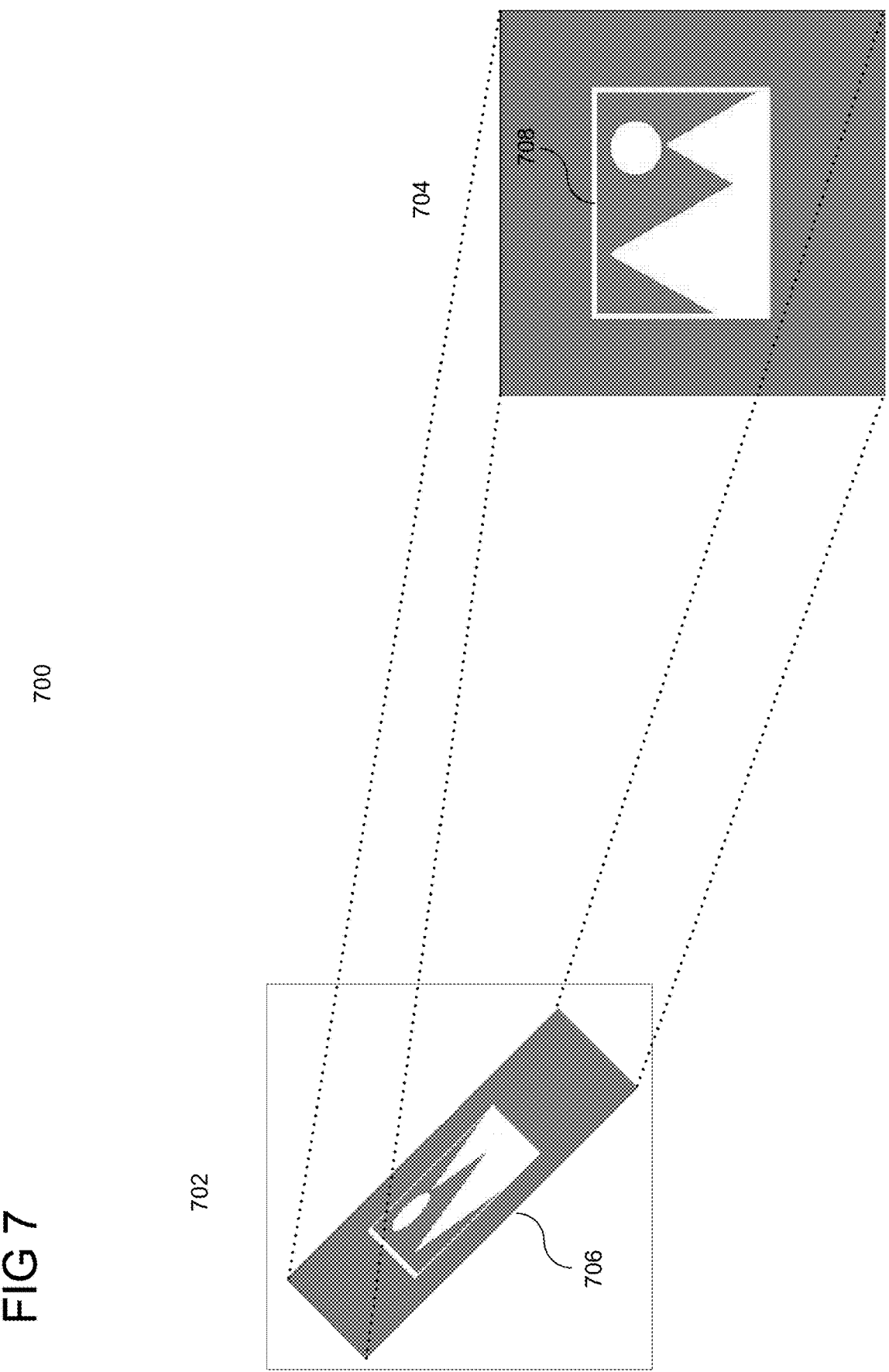

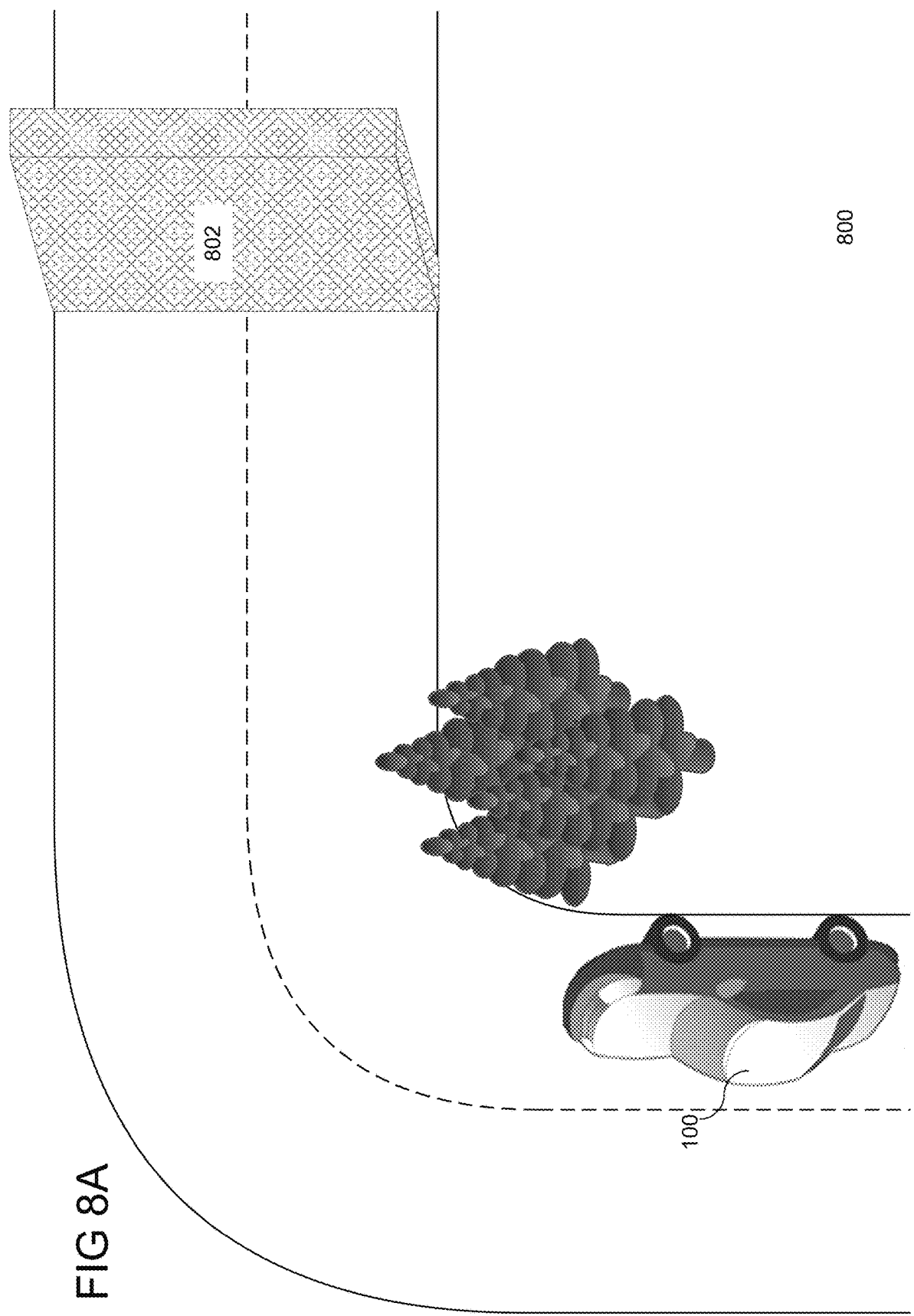

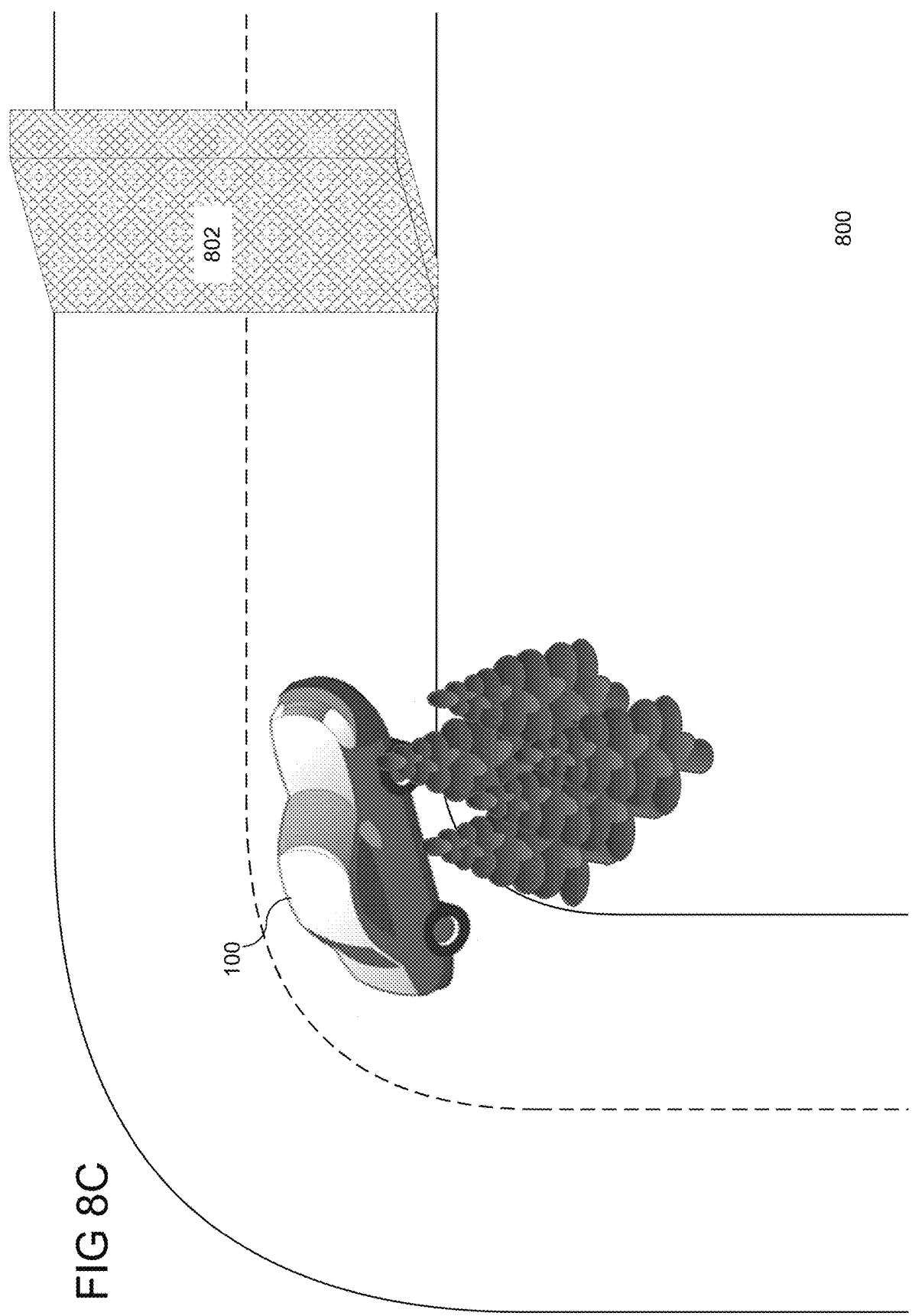

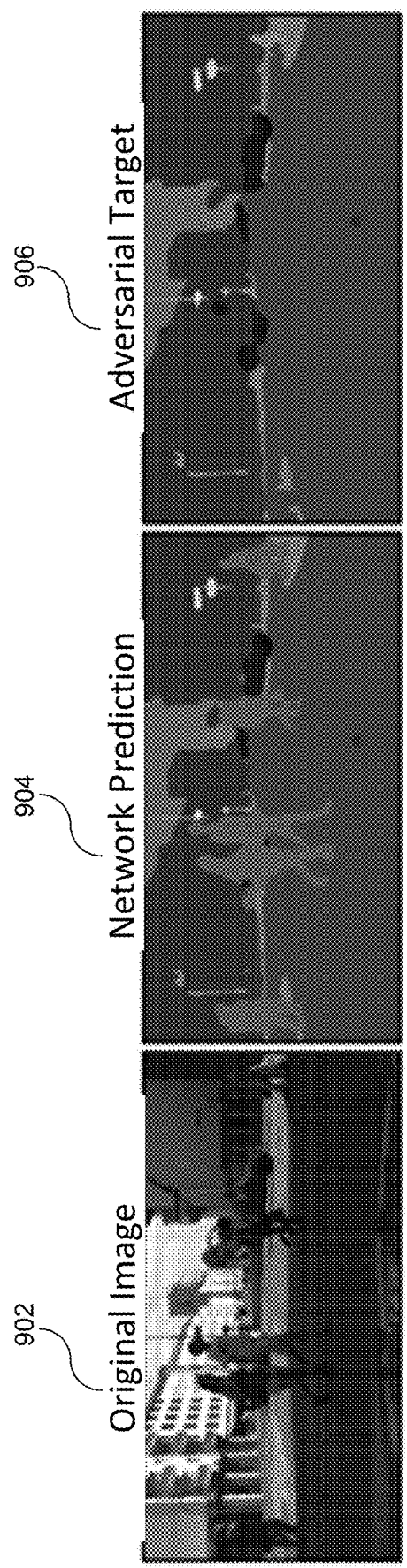

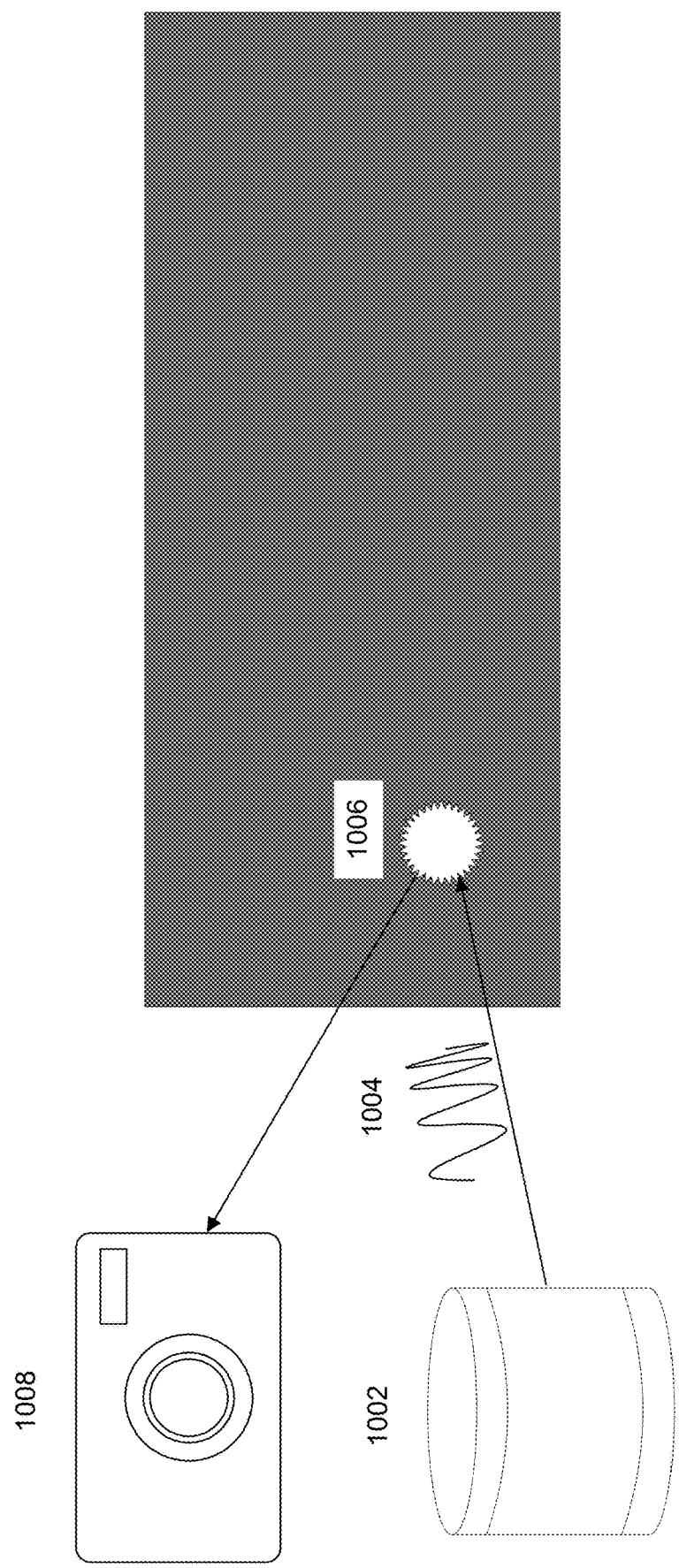

FIG 11
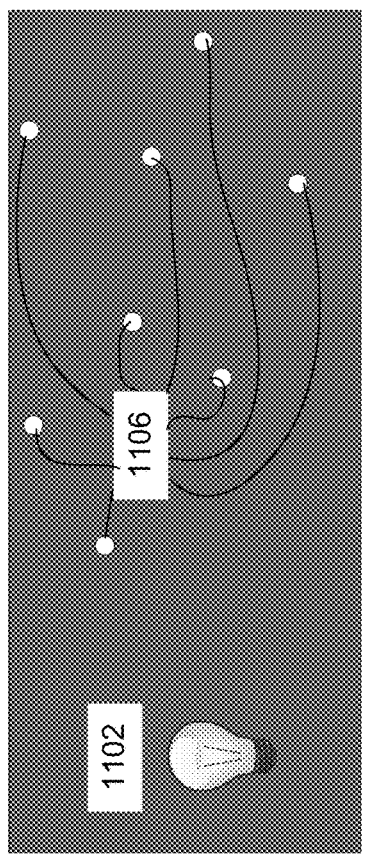
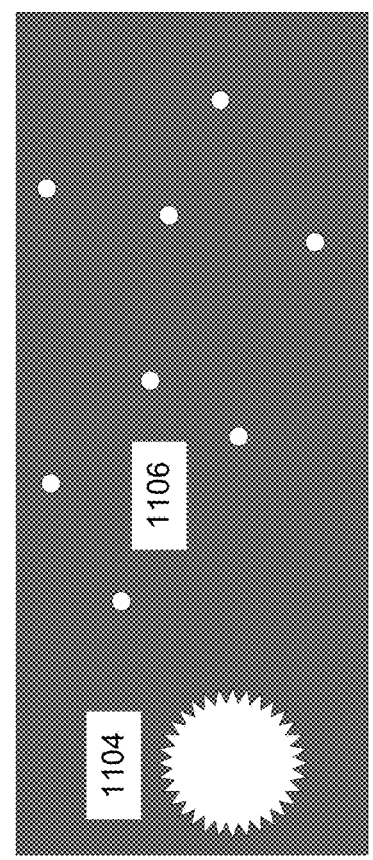

1702 — Obtaining at least one pixel of an image, wherein the pixel is associated with a change in light intensity

1704 — Determining a reference signal frequency associated with a transmitted light

1706 — Receiving the plurality of event data associated with a change in a light intensity of the at least one pixel, wherein the light intensity is associated with a light frequency

1708 — Identifying a select event data from the plurality of event data, wherein the light frequency associated with the select event data is substantially the same as the reference signal frequency

1710 — Filtering a filter event data from the plurality of event data, wherein the light frequency associated with the filter event data is not substantially the same as the reference signal frequency

1712 — Determining an object based on the at least one pixel, wherein the object is fully enclosed by a bounding box comprising coordinates of a rectangular border

1714 — Calculating a distance between a set of coordinates of the bounding box closest to the autonomous vehicle and the autonomous vehicle

1716 — Calculating the time to contact between the set of coordinates of the bounding box and the autonomous vehicle ND DEVICES FOR DETECTING
OBJECTS AND CALCULATING A TIME TO
CONTACT IN AUTONOMOUS DRIVING
SYSTEMS

TECHNICAL FIELD

Various aspects of this disclosure generally relate to autonomous driving systems.

BACKGROUND

Autonomous driving utilizes reliable driving control and safety systems that process data acquired at a vehicle. Using data acquired at the vehicle, which may include data about the vehicle's environment or data about the vehicle itself, the vehicle may alter its movements, modify its positioning with respect to external elements, and/or respond to newly detected events. Additionally, autonomous vehicles may be configured to communicate with other devices, such as other vehicles, network infrastructure elements, wireless devices, etc., to assist in the mobility control, provide faster information processing, and, generally speaking, communicate information in order to improve overall system performance.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 7 shows an exemplary image transformation according to some aspects.

FIGS. 8A-8C show an exemplary autonomous vehicle rapidly approaching an object according to some aspects.

FIG. 9 shows an exemplary failure of an object detection system to segment an adversarial target according to some aspects.

FIG. 10 shows an exemplary illumination hotspot of an object according to some aspects.

FIG. 11 shows an exemplary filtering of events associated with a different frequency as compared to an event associated with illuminated hotspot of an adversarial object according to some aspects.

FIG. 17 shows an exemplary method according to some aspects.

DESCRIPTION

Figure 1:
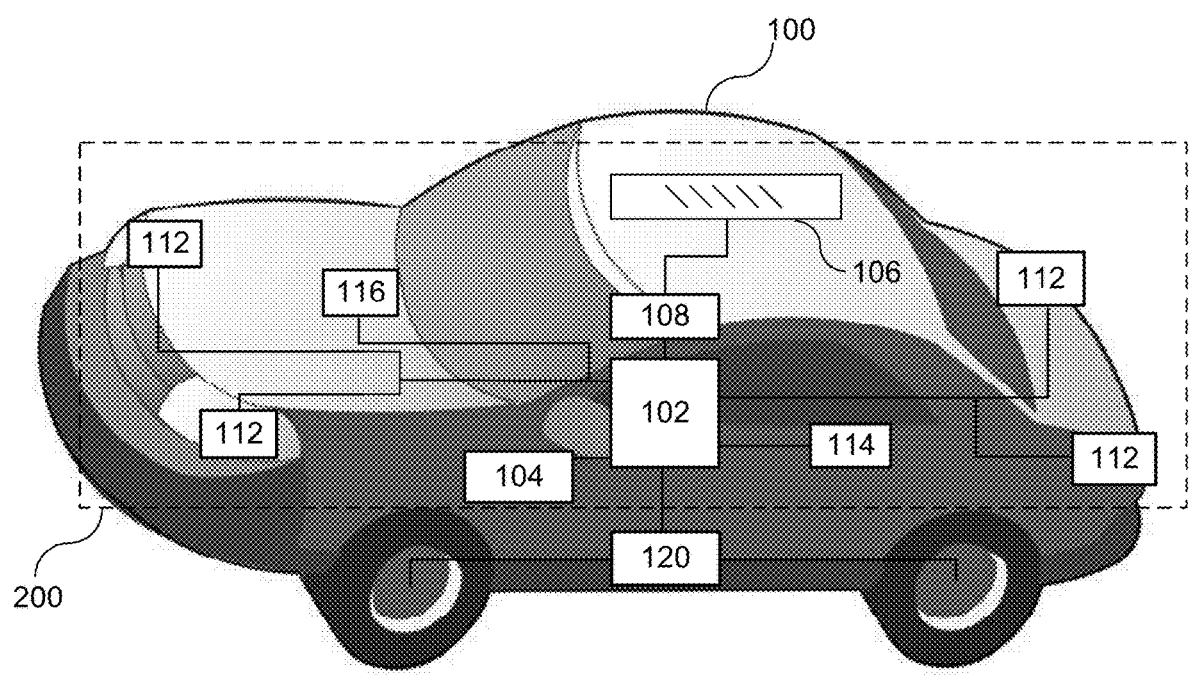
FIG. 1 shows an exemplary autonomous vehicle in accordance with various aspects of the present disclosure.

The following detailed description refers to the accompanying drawings that show, by way of illustration, exemplary details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The phrases "group (of)", "set (of)", "collection (of)", "series (of)", "sequence (of)", "grouping (of)", etc., and the like in the description and in the claims, if any, refer to a quantity equal to or greater than one, i.e., one or more. The phrases "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group including the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven or drivable object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

A "ground vehicle" may be understood to include any type of vehicle, as described above, which is configured to traverse or be driven on the ground, e.g., on a street, on a road, on a track, on one or more rails, off-road, etc. An "aerial vehicle" may be understood to be any type of vehicle, as described above, which is capable of being maneuvered above the ground for any duration of time, e.g., a drone. Similar to a ground vehicle having wheels, belts, etc., for providing mobility on terrain, an "aerial vehicle" may have one or more propellers, wings, fans, among others, for providing the ability to maneuver in the air. An "aquatic vehicle" may be understood to be any type of vehicle, as described above, which is capable of maneuvers on or below the surface of liquid, e.g., a boat on the surface of water or a submarine below the surface. It is appreciated that some vehicles may be configured to operate as one or more of a ground, an aerial, and/or an aquatic vehicle.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (e.g., fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of example, "vehicle operation data" may describe the status of the vehicle such as the type of propulsion unit(s), types of tires or propellers of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Various aspects herein may utilize one or more machine learning models to perform or control functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

Throughout the present disclosure, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing a vehicle to operate according to the manners described herein.

Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

FIG. 1 shows a vehicle 100 including a mobility system 120 and a control system 200 (see also FIG. 2) in accordance with various aspects. It is appreciated that vehicle 100 and control system 200 are exemplary in nature and may thus be simplified for explanatory purposes. For example, while vehicle 100 is depicted as a ground vehicle, aspects of this disclosure may be equally or analogously applied to aerial vehicles such as drones or aquatic vehicles such as boats. Furthermore, the quantities and locations of elements, as well as relational distances (as discussed above, the figures are not to scale) are provided as examples and are not limited thereto. The components of vehicle 100 may be arranged around a vehicular housing of vehicle 100, mounted on or outside of the vehicular housing, enclosed within the vehicular housing, or any other arrangement relative to the vehicular housing where the components move with vehicle 100 as it travels. The vehicular housing, such as an automobile body, drone body, plane or helicopter fuselage, boat hull, or similar type of vehicular body dependent on the type of vehicle that vehicle 100 is.

In addition to including a control system 200, vehicle 100 may also include a mobility system 120. Mobility system 120 may include components of vehicle 100 related to steering and movement of vehicle 100. In some aspects, where vehicle 100 is an automobile, for example, mobility system 120 may include wheels and axles, a suspension, an engine, a transmission, brakes, a steering wheel, associated electrical circuitry and wiring, and any other components used in the driving of an automobile. In some aspects, where vehicle 100 is an aerial vehicle, mobility system 120 may include one or more of rotors, propellers, jet engines, wings, rudders or wing flaps, air brakes, a yoke or cyclic, associated electrical circuitry and wiring, and any other components used in the flying of an aerial vehicle. In some aspects, where vehicle 100 is an aquatic or sub-aquatic vehicle, mobility system 120 may include any one or more of rudders, engines, propellers, a steering wheel, associated electrical circuitry and wiring, and any other components used in the steering or movement of an aquatic vehicle. In some aspects, mobility system 120 may also include autonomous driving functionality, and accordingly may include an interface with one or more processors 102 configured to perform autonomous driving computations and decisions and an array of sensors for movement and obstacle sensing. In this sense, the mobility system 120 may be provided with instructions to direct the navigation and/or mobility of vehicle 100 from one or more components of the control system 200. The autonomous driving components of mobility system 120 may also interface with one or more radio frequency (RF) transceivers 108 to facilitate mobility coordination with other nearby vehicular communication devices and/or central networking components that perform decisions and/or computations related to autonomous driving.

Figure 2:
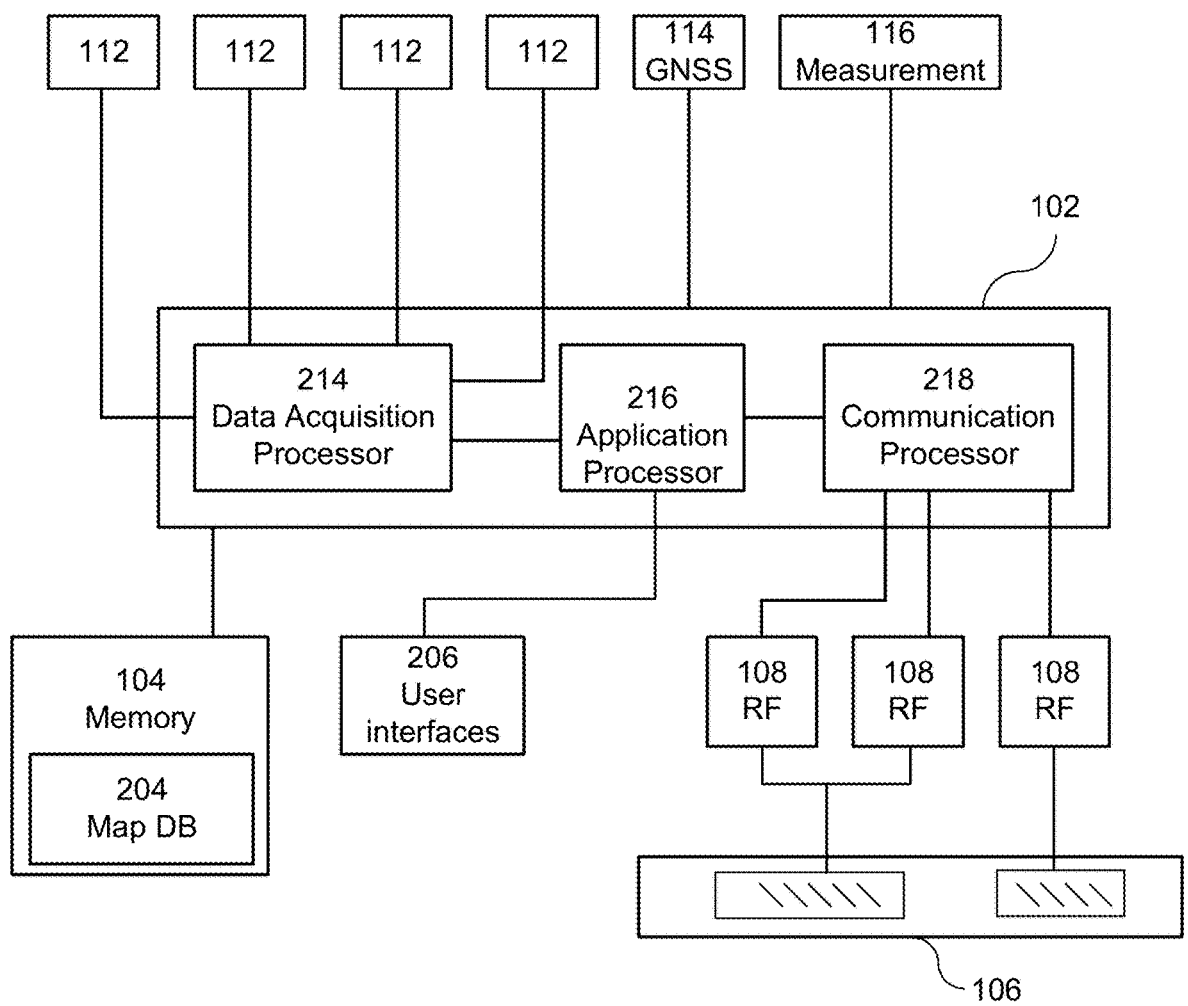
FIG. 2 shows various exemplary electronic components of a safety system of the vehicle in accordance with various aspects of the present disclosure.

The control system 200 may include various components depending on the requirements of a particular implementation. As shown in FIG. 1 and FIG. 2, the control system 200 may include one or more processors 102, one or more memories 104, an antenna system 106 which may include one or more antenna arrays at different locations on the vehicle for radio frequency (RF) coverage, one or more radio frequency (RF) transceivers 108, one or more data acquisition devices 112, one or more position devices 114 which may include components and circuitry for receiving and determining a position based on a Global Navigation Satellite System (GNSS) and/or a Global Positioning System (GPS), and one or more measurement sensors 116, e.g. speedometer, altimeter, gyroscope, velocity sensors, etc.

The control system 200 may be configured to control the vehicle's 100 mobility via mobility system 120 and/or interactions with its environment, e.g. communications with other devices or network infrastructure elements (NIEs) such as base stations, via data acquisition devices 112 and the radio frequency communication arrangement including the one or more RF transceivers 108 and antenna system 106.

The one or more processors 102 may include a data acquisition processor 214, an application processor 216, a communication processor 218, and/or any other suitable processing device. Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 104. In other words, a memory of the one or more memories 104 may store software that, when executed by a processor (e.g., by the one or more processors 102), controls the operation of the system, e.g., a driving and/or safety system. A memory of the one or more memories 104 may store one or more databases and image processing software, as well as a trained system, such as a neural network, or a deep neural network, for example. The one or more memories 104 may include any number of random-access memories, read only memories, flash memories, disk drives, optical storage, tape storage, removable storage and other types of storage. Alternatively, each of processors 214, 216, 218 may include an internal memory for such storage.

The data acquisition processor 216 may include processing circuitry, such as a CPU, for processing data acquired by data acquisition units 112. For example, if one or more data acquisition units are image acquisition units, e.g. one or more cameras, then the data acquisition processor may include image processors for processing image data using the information obtained from the image acquisition units as an input. The data acquisition processor 216 may therefore be configured to create voxel maps detailing the surrounding of the vehicle 100 based on the data input from the data acquisition units 112, i.e., cameras in this example.

Application processor 216 may be a CPU, and may be configured to handle the layers above the protocol stack, including the transport and application layers. Application processor 216 may be configured to execute various applications and/or programs of vehicle 100 at an application layer of vehicle 100, such as an operating system (OS), a user interfaces (UI) 206 for supporting user interaction with vehicle 100, and/or various user applications. Application processor 216 may interface with communication processor 218 and act as a source (in the transmit path) and a sink (in the receive path) for user data, such as voice data, audio/video/image data, messaging data, application data, basic Internet/web access data, etc. In the transmit path, communication processor 218 may therefore receive and process outgoing data provided by application processor 216 according to the layer-specific functions of the protocol stack, and provide the resulting data to digital signal processor 208. Communication processor 218 may then perform physical layer processing on the received data to produce digital baseband samples, which digital signal processor may provide to RF transceiver(s) 108. RF transceiver(s) 108 may then process the digital baseband samples to convert the digital baseband samples to analog RF signals, which RF transceiver(s) 108 may wirelessly transmit via antenna system 106. In the receive path, RF transceiver(s) 108 may receive analog RF signals from antenna system 106 and process the analog RF signals to obtain digital baseband samples. RF transceiver(s) 108 may provide the digital baseband samples to communication processor 218, which may perform physical layer processing on the digital baseband samples. Communication processor 218 may then provide the resulting data to other processors of the one or more processors 102, which may process the resulting data according to the layer-specific functions of the protocol stack and provide the resulting incoming data to application processor 216. Application processor 216 may then handle the incoming data at the application layer, which can include execution of one or more application programs with the data and/or presentation of the data to a user via one or more user interfaces 206. User interfaces 206 may include one or more screens, microphones, mice, touchpads, keyboards, or any other interface providing a mechanism for user input.

The communication processor 218 may include a digital signal processor and/or a controller which may direct such communication functionality of vehicle 100 according to the communication protocols associated with one or more radio access networks, and may execute control over antenna system 106 and RF transceiver(s) 108 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness, the configuration of vehicle 100 shown in FIGS. 1 and 2 may depict only a single instance of such components.

Vehicle 100 may transmit and receive wireless signals with antenna system 106, which may be a single antenna or an antenna array that includes multiple antenna elements. In some aspects, antenna system 202 may additionally include analog antenna combination and/or beamforming circuitry. In the receive (RX) path, RF transceiver(s) 108 may receive analog radio frequency signals from antenna system 106 and perform analog and digital RF front-end processing on the analog radio frequency signals to produce digital baseband samples (e.g., In-Phase/Quadrature (IQ) samples) to provide to communication processor 218. RF transceiver(s) 108 may include analog and digital reception components including amplifiers (e.g., Low Noise Amplifiers (LNAs)), filters, RF demodulators (e.g., RF IQ demodulators)), and analog-to-digital converters (ADCs), which RF transceiver(s) 108 may utilize to convert the received radio frequency signals to digital baseband samples. In the transmit (TX) path, RF transceiver(s) 108 may receive digital baseband samples from communication processor 218 and perform analog and digital RF front-end processing on the digital baseband samples to produce analog radio frequency signals to provide to antenna system 106 for wireless transmission. RF transceiver(s) 108 may thus include analog and digital transmission components including amplifiers (e.g., Power Amplifiers (PAs), filters, RF modulators (e.g., RF IQ modulators), and digital-to-analog converters (DACs), which RF transceiver(s) 108 may utilize to mix the digital baseband samples received from communication processor 218 and produce the analog radio frequency signals for wireless transmission by antenna system 106. In some aspects, communication processor 218 may control the radio transmission and reception of RF transceiver(s) 108, including specifying the transmit and receive radio frequencies for operation of RF transceiver(s) 108.

According to some aspects, communication processor 218 includes a baseband modem configured to perform physical layer (PHY, Layer 1) transmission and reception processing to, in the transmit path, prepare outgoing transmit data provided by communication processor 218 for transmission via RF transceiver(s) 108, and, in the receive path, prepare incoming received data provided by RF transceiver(s) 108 for processing by communication processor 218. The baseband modem may include a digital signal processor and/or a controller. The digital signal processor may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. The digital signal processor may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, the digital signal processor may include one or more processors configured to retrieve and execute program code that defines control and processing logic for physical layer processing operations. In some aspects, the digital signal processor may execute processing functions with software via the execution of executable instructions. In some aspects, the digital signal processor may include one or more dedicated hardware circuits (e.g., ASICs, FPGAs, and other hardware) that are digitally configured to specific execute processing functions, where the one or more processors of digital signal processor may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of the digital signal processor may be realized as a coupled integrated circuit.

Vehicle 100 may be configured to operate according to one or more radio communication technologies. The digital signal processor of the communication processor 218 may be responsible for lower-layer processing functions (e.g., Layer 1/PHY) of the radio communication technologies, while a controller of the communication processor 218 may be responsible for upper-layer protocol stack functions (e.g., Data Link Layer/Layer 2 and/or Network Layer/Layer 3). The controller may thus be responsible for controlling the radio communication components of vehicle 100 (antenna system 106, RF transceiver(s) 108, position device 114, etc.) in accordance with the communication protocols of each supported radio communication technology, and accordingly may represent the Access Stratum and Non-Access Stratum (NAS) (also encompassing Layer 2 and Layer 3) of each supported radio communication technology. The controller may be structurally embodied as a protocol processor configured to execute protocol stack software (retrieved from a controller memory) and subsequently control the radio communication components of vehicle 100 to transmit and receive communication signals in accordance with the corresponding protocol stack control logic defined in the protocol stack software. The controller may include one or more processors configured to retrieve and execute program code that defines the upper-layer protocol stack logic for one or more radio communication technologies, which can include Data Link Layer/Layer 2 and Network Layer/Layer 3 functions. The controller may be configured to perform both user-plane and control-plane functions to facilitate the transfer of application layer data to and from vehicle 100 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by the controller of communication processor 218 may include executable instructions that define the logic of such functions.

In some aspects, vehicle 100 may be configured to transmit and receive data according to multiple radio communication technologies. Accordingly, in some aspects one or more of antenna system 106, RF transceiver(s) 108, and communication processor 218 may include separate components or instances dedicated to different radio communication technologies and/or unified components that are shared between different radio communication technologies. For example, in some aspects, multiple controllers of communication processor 218 may be configured to execute multiple protocol stacks, each dedicated to a different radio communication technology and either at the same processor or different processors. In some aspects, multiple digital signal processors of communication processor 218 may include separate processors and/or hardware accelerators that are dedicated to different respective radio communication technologies, and/or one or more processors and/or hardware accelerators that are shared between multiple radio communication technologies. In some aspects, RF transceiver(s) 108 may include separate RF circuitry sections dedicated to different respective radio communication technologies, and/or RF circuitry sections shared between multiple radio communication technologies. In some aspects, antenna system 106 may include separate antennas dedicated to different respective radio communication technologies, and/or antennas shared between multiple radio communication technologies. Accordingly, antenna system 106, RF transceiver(s) 108, and communication processor 218 can encompass separate and/or shared components dedicated to multiple radio communication technologies.

Communication processor 218 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. Communication processor 218 may be configured to transmit communications including communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

Communication processor 218 may be configured to operate via a first RF transceiver of the one or more RF transceivers(s) 108 according to different desired radio communication protocols or standards. By way of example, communication processor 218 may be configured in accordance with a Short-Range mobile radio communication standard such as e.g. Bluetooth, Zigbee, and the like, and the first RF transceiver may correspond to the corresponding Short-Range mobile radio communication standard. As another example, communication processor 218 may be configured to operate via a second RF transceiver of the one or more RF transceivers(s) 108 in accordance with a Medium or Wide Range mobile radio communication standard such as, e.g., a 3G (e.g. Universal Mobile Telecommunications System—UMTS), a 4G (e.g. Long Term Evolution—LTE), or a 5G mobile radio communication standard in accordance with corresponding 3GPP ($3^{rd}$ Generation Partnership Project) standards. As a further example, communication processor 218 may be configured to operate via a third RF transceiver of the one or more RF transceivers(s) 108 in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, and the like). The one or more RF transceiver(s) 108 may be configured to transmit signals via antenna system 106 over an air interface. The RF transceivers 108 may each have a corresponding antenna element of antenna system 106, or may share an antenna element of the antenna system 106.

Memory 214 may embody a memory component of vehicle 100, such as a hard drive or another such permanent memory device. Although not explicitly depicted in FIGS. 1 and 2, the various other components of vehicle 100, e.g. one or more processors 102, shown in FIGS. 1 and 2 may additionally each include integrated permanent and non-permanent memory components, such as for storing software program code, buffering data, etc.

The antenna system 106 may include a single antenna or multiple antennas. In some aspects, each of the one or more antennas of antenna system 106 may be placed at a plurality of locations on the vehicle 100 in order to ensure maximum RF coverage. The antennas may include a phased antenna array, a switch-beam antenna array with multiple antenna elements, etc. Antenna system 106 may be configured to operate according to analog and/or digital beamforming schemes in order to maximize signal gains and/or provide levels of information privacy. Antenna system 106 may include separate antennas dedicated to different respective radio communication technologies, and/or antennas shared between multiple radio communication technologies. While shown as a single element in FIG. 1, antenna system 106 may include a plurality of antenna elements (e.g., antenna arrays) positioned at different locations on vehicle 100. The placement of the plurality of antenna elements may be strategically chosen in order to ensure a desired degree of RF coverage. For example, additional antennas may be placed at the front, back, corner(s), and/or on the side(s) of the vehicle 100.

Data acquisition devices 112 may include any number of data acquisition devices and components depending on the requirements of a particular application. This may include: image acquisition devices, proximity detectors, acoustic sensors, infrared sensors, piezoelectric sensors, etc., for providing data about the vehicle's environment. Image acquisition devices may include cameras (e.g., standard cameras, digital cameras, video cameras, single-lens reflex cameras, infrared cameras, stereo cameras, etc.), charge coupling devices (CCDs) or any type of image sensor. Proximity detectors may include radar sensors, light detection and ranging (LIDAR) sensors, mmWave radar sensors, etc. Acoustic sensors may include: microphones, sonar sensors, ultrasonic sensors, etc. Accordingly, each of the data acquisition units may be configured to observe a particular type of data of the vehicle's 100 environment and forward the data to the data acquisition processor 214 in order to provide the vehicle with an accurate portrayal of the vehicle's environment. The data acquisition devices 112 may be configured to implement pre-processed sensor data, such as radar target lists or LIDAR target lists, in conjunction with acquired data.

Measurement devices 116 may include other devices for measuring vehicle-state parameters, such as a velocity sensor (e.g., a speedometer) for measuring a velocity of the vehicle 100, one or more accelerometers (either single axis or multi-axis) for measuring accelerations of the vehicle 100 along one or more axes, a gyroscope for measuring orientation and/or angular velocity, odometers, altimeters, thermometers, etc. It is appreciated that vehicle 100 may have different measurement devices 116 depending on the type of vehicle it is, e.g., car vs. drone vs. boat.

Position devices 114 may include components for determining a position of the vehicle 100. For example, this may include global position system (GPS) or other global navigation satellite system (GNSS) circuitry configured to receive signals from a satellite system and determine a position of the vehicle 100. Position devices 114, accordingly, may provide vehicle 100 with satellite navigation features.

The one or more memories 104 may store data, e.g., in a database or in any different format, that may correspond to a map. For example, the map may indicate a location of known landmarks, roads, paths, network infrastructure elements, or other elements of the vehicle's 100 environment. The one or more processors 102 may process sensory information (such as images, radar signals, depth information from LIDAR, or stereo processing of two or more images) of the environment of the vehicle 100 together with position information, such as a GPS coordinate, a vehicle's ego-motion, etc., to determine a current location of the vehicle 100 relative to the known landmarks, and refine the determination of the vehicle's location. Certain aspects of this technology may be included in a localization technology such as a mapping and routing model.

The map database (DB) 204 may include any type of database storing (digital) map data for the vehicle 100, e.g., for the control system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In some aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

Furthermore, the control system 200 may include a driving model, e.g., implemented in an advanced driving assistance system (ADAS) and/or a driving assistance and automated driving system. By way of example, the control system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 100 may include the control system 200 as also described with reference to FIG. 2. The vehicle 100 may include the one or more processors 102 integrated with or separate from an engine control unit (ECU) which may be included in the mobility system 120 of the vehicle 100. The control system 200 may, in general, generate data to control or assist to control the ECU and/or other components of the vehicle 100 to directly or indirectly control the movement of the vehicle 100 via mobility system 120. The one or more processors 102 of the vehicle 100 may be configured to implement the aspects and methods described herein.

The components illustrated in FIGS. 1 and 2 may be operatively connected to one another via any appropriate interfaces. Furthermore, it is appreciated that not all the connections between the components are explicitly shown, and other interfaces between components may be covered within the scope of this disclosure.

Figure 3:
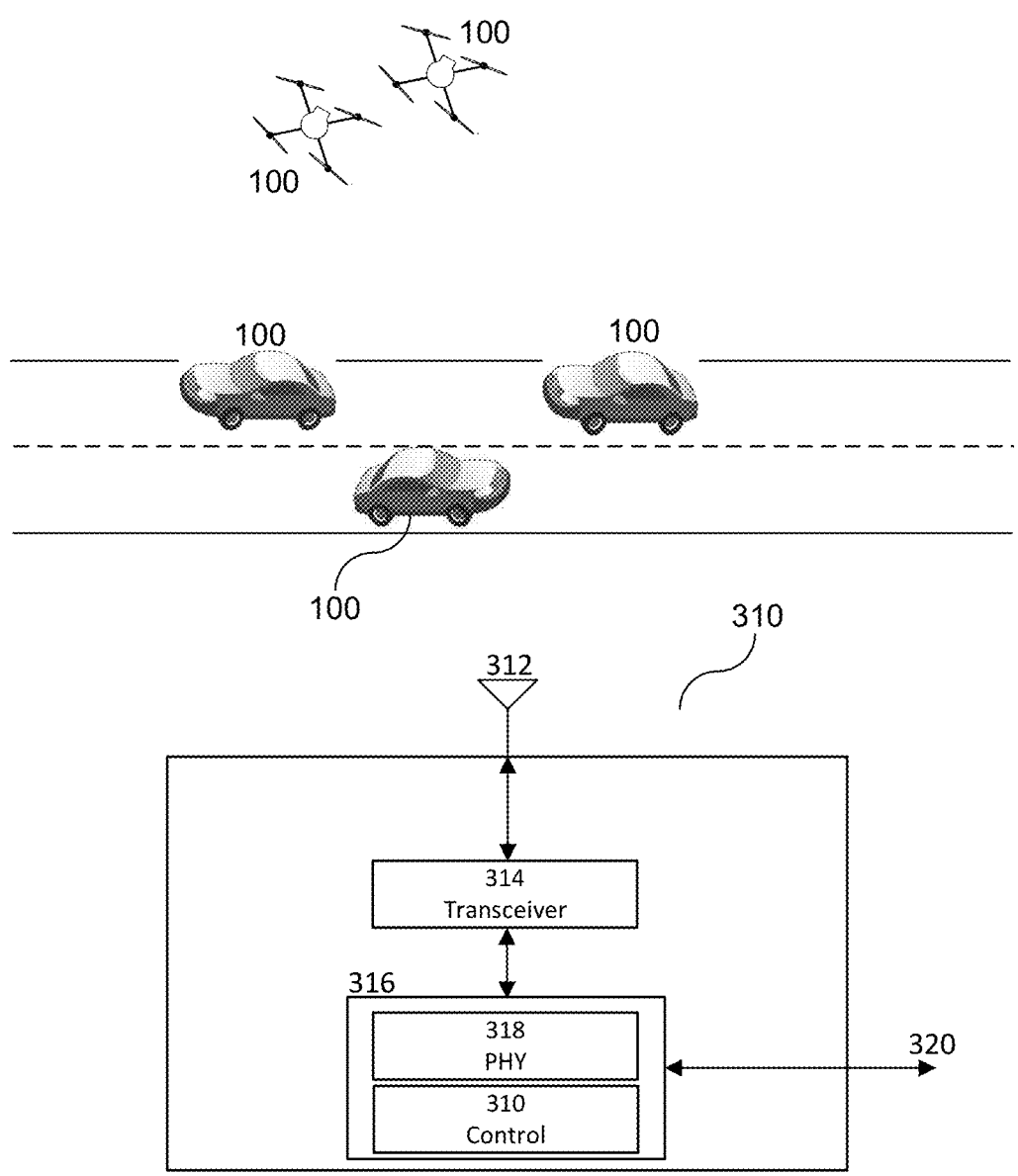
FIG. 3 shows an exemplary network area with various communication devices according to some aspects.

FIG. 3 shows an exemplary network area 300 according to some aspects. Network area 300 may include a plurality of vehicles 100, which may include, for example, drones and ground vehicles. Any one of these vehicles may communicate with one or more other vehicles 100 and/or with network infrastructure element (NIE) 310. NIE 310 may be a base station (e.g. an eNodeB, a gNodeB, etc.), a road side unit (RSU), a road sign configured to wirelessly communicate with vehicles and/or a mobile radio communication network, etc., and serve as an interface between one or more of vehicles 100 and a mobile radio communications network, e.g., an LTE network or a 5G network.

NIE 310 may include, among other components, at least one of an antenna system 312, a RF transceiver 314, and a baseband circuit 316 with appropriate interfaces between each of them. In an abridged overview of the operation of NIE 310, NIE 310 may transmit and receive wireless signals via antenna system 312, which may be an antenna array including multiple antenna arrays. Antenna system 312 may include multiple antenna elements (e.g., multiple antenna arrays) in order to employ multiple-input and multiple-output (MIMO) methods and schemes.

RF transceiver 314 may perform transmit and receive RF processing to convert outgoing baseband samples from baseband circuit 316 into analog radio signals to provide to antenna system 312 for radio transmission and to convert incoming analog radio signals received from antenna system 312 into baseband samples to provide to baseband circuit 316. Accordingly, RF transceiver 314 may be configured to operate similarly to the RF transceiver(s) described in FIGS. 1 and 2, albeit perhaps on a much larger scale (e.g., amplifiers to transmit higher power signals, etc.).

Baseband circuit 316 may include a controller 310 and a physical layer processor 318 which may be configured to perform transmit and receive PHY processing on baseband samples received from RF transceiver 314 to provide to a controller 310 and on baseband samples received from controller 310 to provide to RF transceiver 314. In some aspects, the baseband modem 316 may be located external to the NIE 310, e.g., at a centralized location of a mobile radio communication network. Controller 310 may control the communication functionality of NIE 310 according to the corresponding radio communication technology protocols, which may include exercising control over antenna system 312, RF transceiver 314, and physical layer processor 318. Each of RF transceiver 314, physical layer processor 318, and controller 310 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. NIE 310 may also include an interface 320 for communicating with (e.g. receiving instructions from, providing data to, etc.) with a core network according to some aspects.

Additionally, NIE 310 may include a memory 330, which may be internal to NIE 310 (as shown in FIG. 3) or external to NIE 310 (not shown). Memory 330 may store one or more maps of the coverage area of NIE 310 among other types of information. Each of the one or more maps may include a static layer depicting environmental elements that remain largely unchanged over longer periods of time (e.g., roads, structures, trees, etc.) and/or a dynamic layer with more frequent changes (e.g., vehicles, detected obstacles, construction, etc.). In some aspects, memory 330 may also store maps corresponding to one or more neighboring areas of NIE 310 so as to provide vehicles within its coverage area with information of neighboring coverage areas (e.g., to facilitate the process when a vehicle moves to the coverage of the neighboring NIE).

Autonomous vehicles may employ visual perception systems to detect its surrounding environment. ADAS and Advanced emergency braking (AEB) systems may be used to avoid collisions. However, these systems may be vulnerable to slow or static objects, such as fire engines or cement road dividers, which may appear in unexpected places. If an autonomous vehicle approaches a slow or static object at a relatively high speed, may result in a collision. Identifying such slow or static objects may prevent collisions.

The appropriate response to the presence of obstacles in the desired direction of travel depends on the type of object, its relative distance and the time to contact (TTC). The latter in particular is key as it relates both the relative distance and the reaction time needed to handle the obstacle. A fast and accurate method for detection and estimation of the TTC of close foreground objects captured with an event camera is a crucial task.

Calculating TTC may take advantage of high temporal resolution provided by a Dynamic Vision Sensor (DVS) to construct images unaffected by motion blur which encode information related to dynamic obstacles in a scene at high frame rate.

For example, an Event-Based camera may be used to construct images of a vehicle's environment including dynamic obstacles relative to the camera. Using a single image constructed from events of an Event-Based camera a neural network may be used to generate bounding boxes of detected objects in the vehicle's environment. Additionally, an accurate estimate of their time to contact as well as the point of contact on the plane of the camera may be generated.

This information may be provided to ADAS/AEB systems directly and/or combined with other sensor data to improve safety and reliability of autonomous vehicles, either driverless or with a human driver.

Images constructed from a DVS or Event-Based camera may be used to calculate the TTC between foreground objects detected or perceived in the vehicle's environment. DVS or Event-Based cameras output pixels in which pixel-level light intensity/brightness changes (spikes) at the time the change occurs rather than full images at a fixed frame rate. This offers high dynamic range, no motion blur, and high temporal resolution in microseconds.

A convolutional neural network (CNN) may be used to efficiently calculate TTC from an event generated by an Event-Based camera. The CNN may be trained to include a large variety of environments and situations to mimic real world scenarios. It should be noted that other machine learning techniques may be used to calculate as part of a TTC calculation model.

The TTC calculation model may employ the previously described CNN as part of a network. For example, an image constructed by combining events received from a DVS or Event-Based camera may be input into the TTC calculation model to compute a time surface. A Random Forest trained to discriminate corner points may be implemented to determine the probability that an event is a corner. The efficient stream of corner events may be used for further processing to determine a TTC.

During training of the Random Forest, or any other learning method for classification, the ground truth is provided as input. The ground truth consists of bounding boxes, the time to contact, and the point of contact. The point of contact is relative to the camera plane of forward objects in the field of view of the camera.

Additionally, the network may use a probabilistic model to determine the probability that the probability that the time surface is a foreground object. The TTC calculation model may then output the probability that the object is a foreground object, time to collision, and point of contact based on processing of a single time surface image constructed from accumulating events at a high frame rate. Additionally, it adds a fast and robust object detection capability prioritizing fast approaching objects posing a high risk of collision. The detected objects can then be further processed, e.g., to categorize based on object class, size or other attributes, or fed directly into ADAS and/or AEB systems.

The network is a chain of two modules connected to four output streams. The first two modules implement feature extraction and region of interest extraction. Each of the output streams consists of a series of fully connected layers. One output represents the position and size of a bounding box. Another output denotes the probability that the bounding box contains a foreground object. Yet another output estimates time to contact and the last output estimates a distance of contact measured respect the origin of the camera.

For example, the network may include a convolutional neural network (CNN) with fully connected layers shared across all spatial locations. This may be implemented with a larger convolutional layer followed by smaller convolutional layers for regression and classification. Multiple sections of a feature map may predict multiple region proposals. Within each section of the feature map, the multiple region proposals are associated with a scale and aspect ratios.

A Region Proposal Network (RPN) takes an image as input and outputs object proposals. As part of the output, the objects proposed include a bounding box predicted by the RPN. A Region of Interest (RoI) pooling layer of the CNN may take the convolutional features as well as the bounding boxes as input before the TTC calculation model determines a point of contact and time to contact.

For example, the RoI may take an image feature map as input and warp the regular grid of the input image with a transformation. For example an affine transformation that preserves points, straight lines, and planes.

Figure 4:
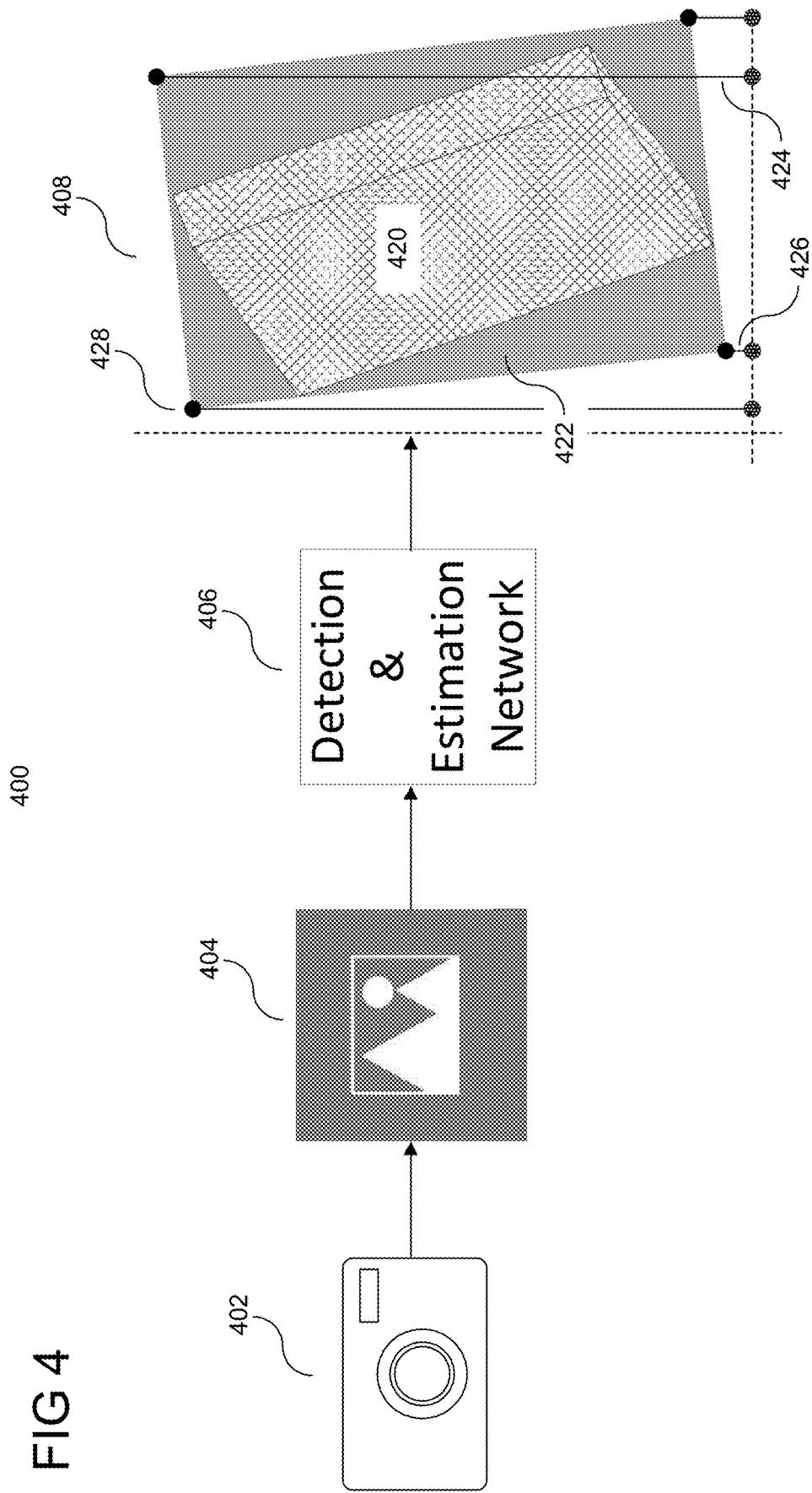
FIG. 4 shows an exemplary system for calculating time to contact according to some aspects.

FIG. 4 shows an exemplary system 400 for object detection and time to contact of an object 420 according to some aspects. System 400 may include Event-Based camera 402, time surface image 404, and detection and estimation network 406. Event-Based camera 402 may generate events based on light intensity changes of pixels. Image 404 may be comprised of a combination of events generated by Event-Based camera 402 to generate a time surface image 404. Detection and estimation network 406 takes a time surface image to detect a bounding box, a time to contact, a point of contact of a foreground object 420. Output 408 may include bounding box 422, distances 424, and time to contact 426. Bounding box 422 of detected object 420 may include corners 428 used to generated distances 424 between the four corners and camera 402. By determining the shortest distance 426 between camera 402 and bounding box 422, detection & estimation network 406 may calculate a time to contact and point of contact.

Event-Based camera 402 may produce a collection of events. Each event may include a time stamp, cartesian (x and y) coordinates of a pixel, and the polarity of the event. A time surface is constructed from the event data to integrate event data into a frame channel. There may be a positive and negative event channel. This may be accomplished by immediately integrating a positive event into an image corresponding to the positive channel. The integration may be implemented by applying an m×m kernel centered on the coordinates of the pixel of the positive event. Negative events are similarly integrated into an image corresponding to the negative channel.

A detection algorithm may take the current state of an image and feed to the appropriate events to the appropriate frame channel. The kernel is intended to mask out pixels which are not in the boundary of objects in the image. Similar to high pass filters or edge detectors in digital image processing, with the addition of also acting along the temporal dimension. Using a maximum weight for the most recent events and decreasing weight of events which are spatially and temporally removed from the most recent event.

Figure 5:
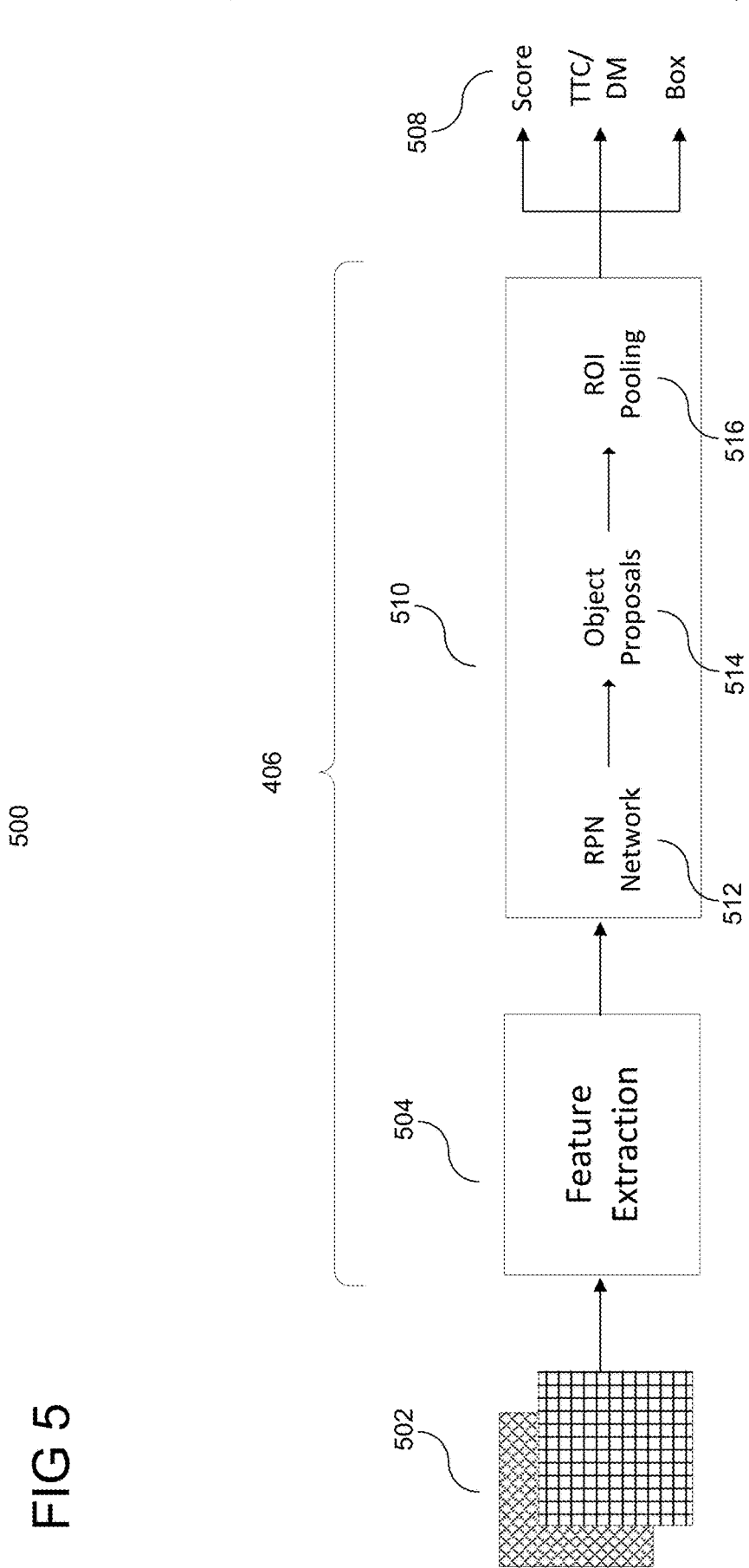
FIG. 5 shows an exemplary network for calculating time to contact according to some aspects.

FIG. 5 shows exemplary architecture 500 of detection and estimation network 406 according to some aspects. Events from Event-Based camera 402 may be used to produce time surface images. As such, the image 404 may include time surface images 502. For example, a negative time surface image and a positive time surface. The time surfaces 502 of image 404 are input into feature extraction module 504. The time surface images 502 are used to generate convolutional features of the time surface images 502 for input to region of interest module 510. Region of interest module 510 may include RPN network 512, object proposal 514, and RoI pooling 516. RPN network 512 uses time surface images 502 to generated object proposals 514 which may include bounding boxes as input into RoI pooling 516. ROI pooling 516 uses object proposals 514 and convolutional features from 504 to generate output 508. Additionally, detection and estimation network 406 may include a probability module. Output 508 may include a probability score, bounding box, time to contact (TTC), and distance measured of a detected object.

Feature extraction module 504 may include a convolutional neural network. For example, ResNet, LeNet, AlexNet, GoogLeNet, or variants of VGG among others may be used for feature extraction module 504.

Figure 6:
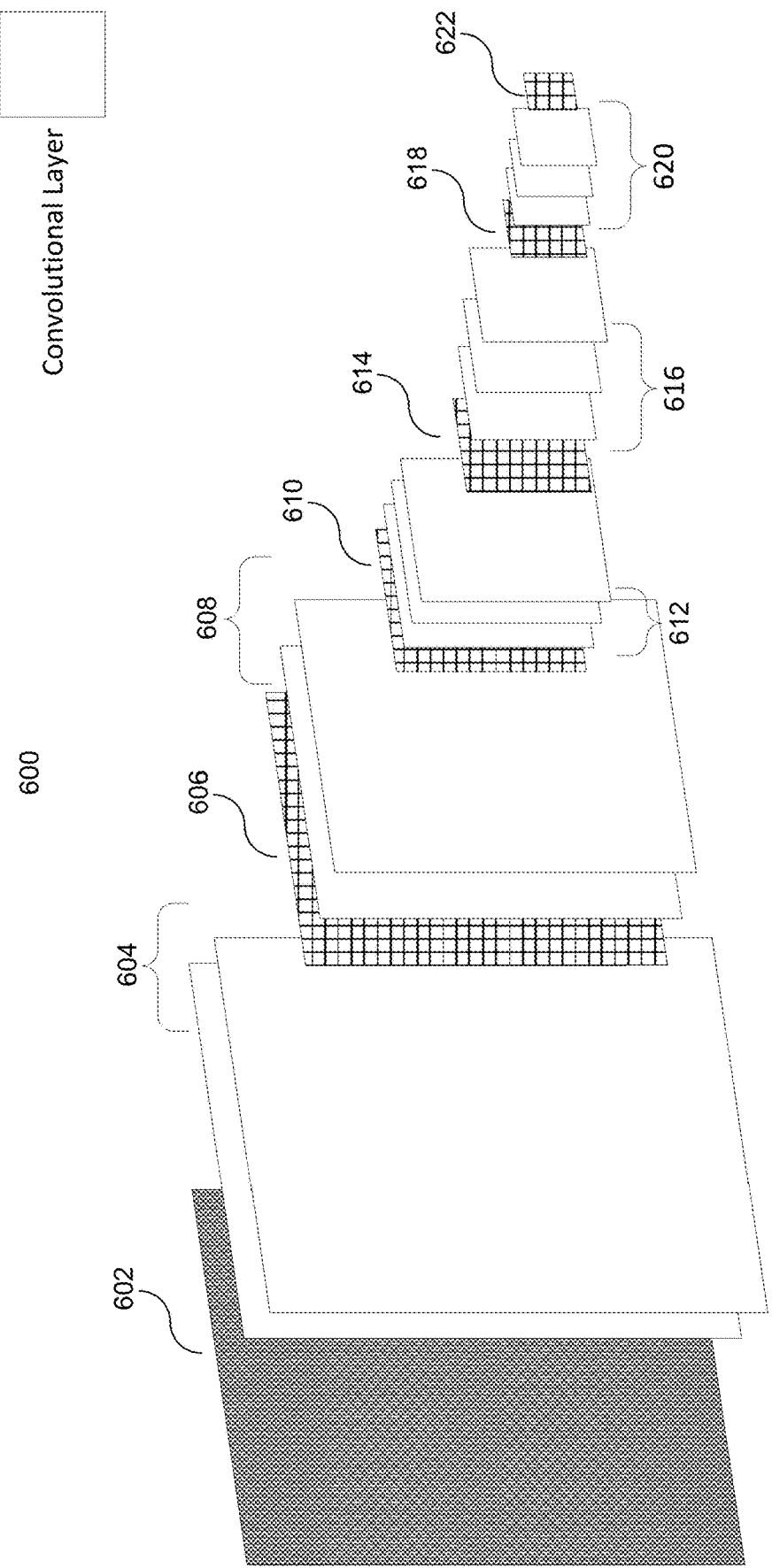
FIG. 6 shows an exemplary feature extraction model according to some aspects.

FIG. 6 shows an exemplary convolutional neural network (CNN) 600 according to some aspects. As input, CNN 600 may take in image 602. There are several convolutional layers and pooling layers between the output. For example, convolutional layers 604, 608, 612, 616, and 620 and pooling layers 606, 610, 614, 618, and 622. The last convolutional layers may not be computed up to the last pooling layer. For example, The last fully connected convolutional layers 620 before max pooling layer 622 may not be computed.

FIG. 7 shows an exemplary transformation 700 of an image as part of RoI pooling 516 according to some aspects. Input feature map 702 may be used as input. Images captured at an odd camera angle may be transformed for easier processing. For example, RoI pooling 516 may apply a warping function to input feature map 702 and transform bounding box 706 to output feature map 704 of object 708.

Figure 8B:
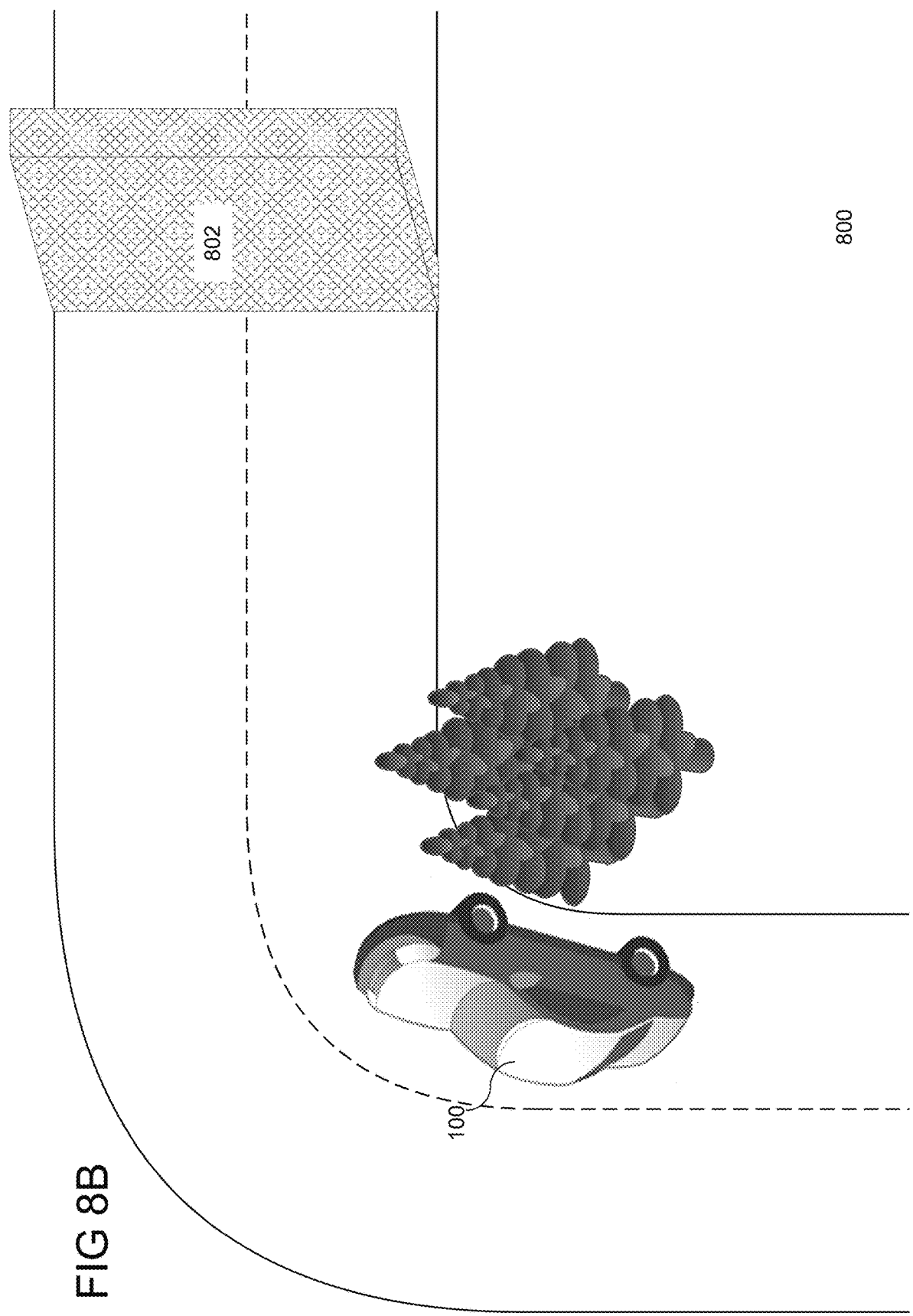

FIGS. 8A-8C show an exemplary scenario where a vehicle may be approaching an stationary object according to some aspects. It may be beneficial to detect stationary objects in unexpected places with enough time to react. FIG. 8A shows scene 800 vehicle 100 approaching object 802. Object 802 is outside the field of vision of the data acquisition device 112. Data acquisition device 112 may be Event-Based camera 402. FIG. 8B shows scene 800 at a later time where object 802 is partially in the field of vision of data acquisition device 112. At this point, detection and estimation network 406 may process an image 404 and determine a time to contact and point of contact with object 802 before it is too late. For example, FIG. 8C shows scene 800 at a third point in time where object 802 may be in full view, but it is too late to avoid a collision. It may be beneficial calculate a time to contact as early and quickly as possible to avoid collisions.

In another aspect, the events produced by camera 402 may be filtered. In addition to stationary objects, Event-Based cameras may be used to efficiently identify a time to collision of vulnerable road users. For example, bicycles, pedestrians, and other non-motorized road users. Because non-motorized road users may have more variety in appearance they may be more difficult to identify. Combining Event-Based cameras with a light source modulated in a specific way may improve the speed and effectiveness in detecting non-motorized road users.

Vulnerable road users (VRU) may use conspicuity aids such as vests and bands of retroreflective material on clothing, for example. Detection of VRUs may be accomplished using sensors such as those that may be found in ADAS systems, including fully autonomous cars. In particular, Event-Based cameras may be used as an additional sensor in vehicles. Event-Based cameras detect pixel-level brightness changes and output the pixels associated with the change at the time the change occurs.

Trying to detect VRUs using deep learning to analyze all pixels of an image to detect objects that can be classified as a pedestrian or cyclist has drawbacks. Having to analyze all pixels has high computational costs, low performance under adverse environmental conditions (i.e. fog, rain, snow), and subject to adversarial attacks.

Using a detectable light source to be detected by an Event-Based camera to detect objects is less computationally expensive and faster than other approaches. For example, other approaches include deep learning approaches or communication using Dedicated Short Range Communication (DSRC), which depends on cooperation from external agents and is not always available. Fast and robust object detection is possible with an event stream of a DVS camera. Because a DVS camera outputs asynchronous events at the pixel level, there is no longer a delay associated with conventional method of integrating events over a time window to build frames at a fixed rate.

The detected objects can be fed into a variety of existing image segmentation, object classification, mobile object tracking, and/or other processing elements of ADAS systems. Finally it can be combined with other sensors, such as LIDAR and RGB cameras to further improve robustness with minimum additional complexity.

For example, FIG. 9 shows an exemplary adversarial attack when trying to identify a VRU. Original image 902 shows that there are several pedestrians at a road intersection. According to network prediction 904 pedestrians shows that several pedestrians may be identified. However, adversarial target 906 shows a failure of a Deep Neural Network in segmenting the pedestrians. Adversarial target 906 shows the image perturbed with universal adversarial noise and the resulting prediction.

A perturbations may denote noise added to the input that was generated to fool an object detection system while being quasi-imperceptible to humans. More severely, there even exist universal perturbations that are input-agnostic, but fool the network on the majority of inputs. The example is a universal perturbation designed to remove the pedestrian class from the segmentation while leaving the segmentation mostly unchanged otherwise.

These attacks show how brittle the decision of DNN may be. While these are attacks based on adding noise to the input (for a human the image with the noise and the image without the noise are indistinguishable), there exist also attacks by adding perturbation in the physical space.

Event cameras may be used to generate regions of interest (RoI) for CNN classifiers. For example, FIG. 10 shows an exemplary system used to identify a VRU. Light source 1002 is a configurable light source to produce a light at a specific frequency. Light source 1002 may be an LED, laser, or any other periodic infrared light source. Light source 1002 may generate light at frequency 1004. Light source 1002 may illuminate an object in a vehicle's environment generating reflection 1006. Reflection 1006 may be detected by Event-Based camera 1008.

Light source 1002 may generate illuminate an object with a detectable signal pattern 1004. The detectable signal 1004 may reflect from the object 1006, such as a VRU, at a sufficiently high rate to create hot spots for an imaging detector. For example, an Event-Based camera 1008 may detect the signal pattern generated by light source 1002 onboard an autonomous vehicle. For example an egomotion vehicle may have an infrared light source 1002 such as an LED or laser on board. When the light is reflected off of a VRU, Event-Based camera 1008 may detect it. Design of basic patterns to enhance detection are also considered.

FIG. 11 shows a proof of concept 1100. An infra-red LED 1102 may be light source 1002 that illuminates targets for detection with a DVS camera 1008. The Event-Based camera 1008 may be configured to detect the frequency of LED 1102. LED 1102 may be powered by either a DC voltage or by a high frequency sinusoidal signal, for example 5V sinusoidal signal with a frequency above 1 KHz. In this case no events are detected by the Event-Based camera 1008. Specks 1106 represent spurious events captured by the camera 1008 that can be easily filtered out.

On the other hand, when LED is powered by a signal, such as a sinusoidal wave in the range of 100 Hz-300 Hz, a large number of events are captured by DVS 1008. For example hot spot 1104 which is at the position of LED 1102. The light from the LED 1102 may be reflected by an object placed a short distance above LED 1102 and the events or hotspot 1104 are captured by DVS 1008. Combining an infra-red light source 1002 driven with a configurable signal 1004 and a DVS sensor 1008 may be used to detect passive targets at a certain distance from the light source 1002/image detector 1008. Autonomous vehicles equipped with these devices can enhance detection of any object of interest, especially VRUs.

Figure 12:
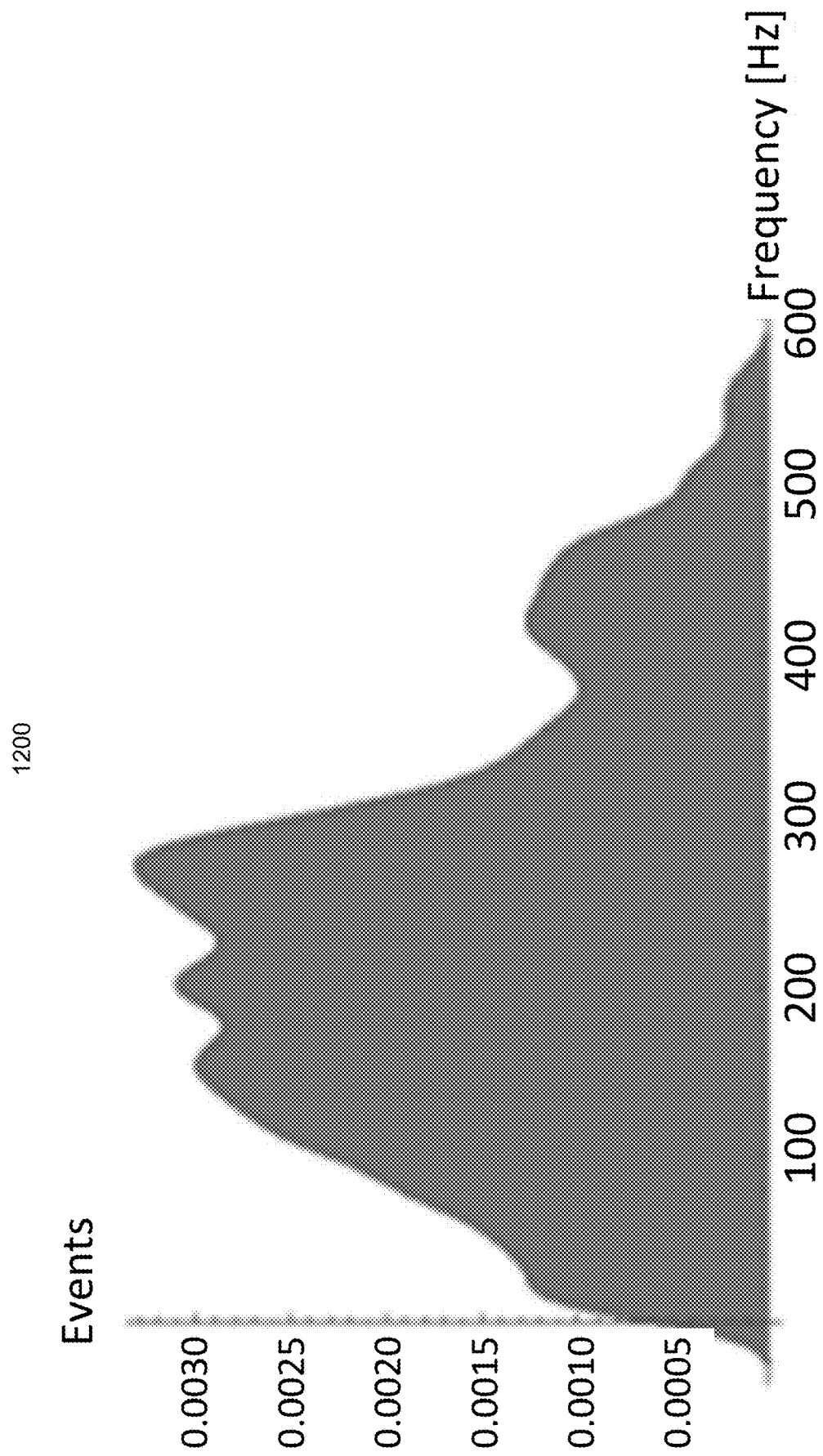
FIG. 12 shows an exemplary range of frequencies for detecting an adversarial object. according to some aspects.

FIG. 12 shows the spectrum 1200 of events captured by DVS 1008 when the LED 1102 is driven by a sinusoidal sweep in the range 0-500 Hz. The DVS sensor 1008 in this case is most sensitive to frequencies in the 100-300 Hz range.

Figure 13:
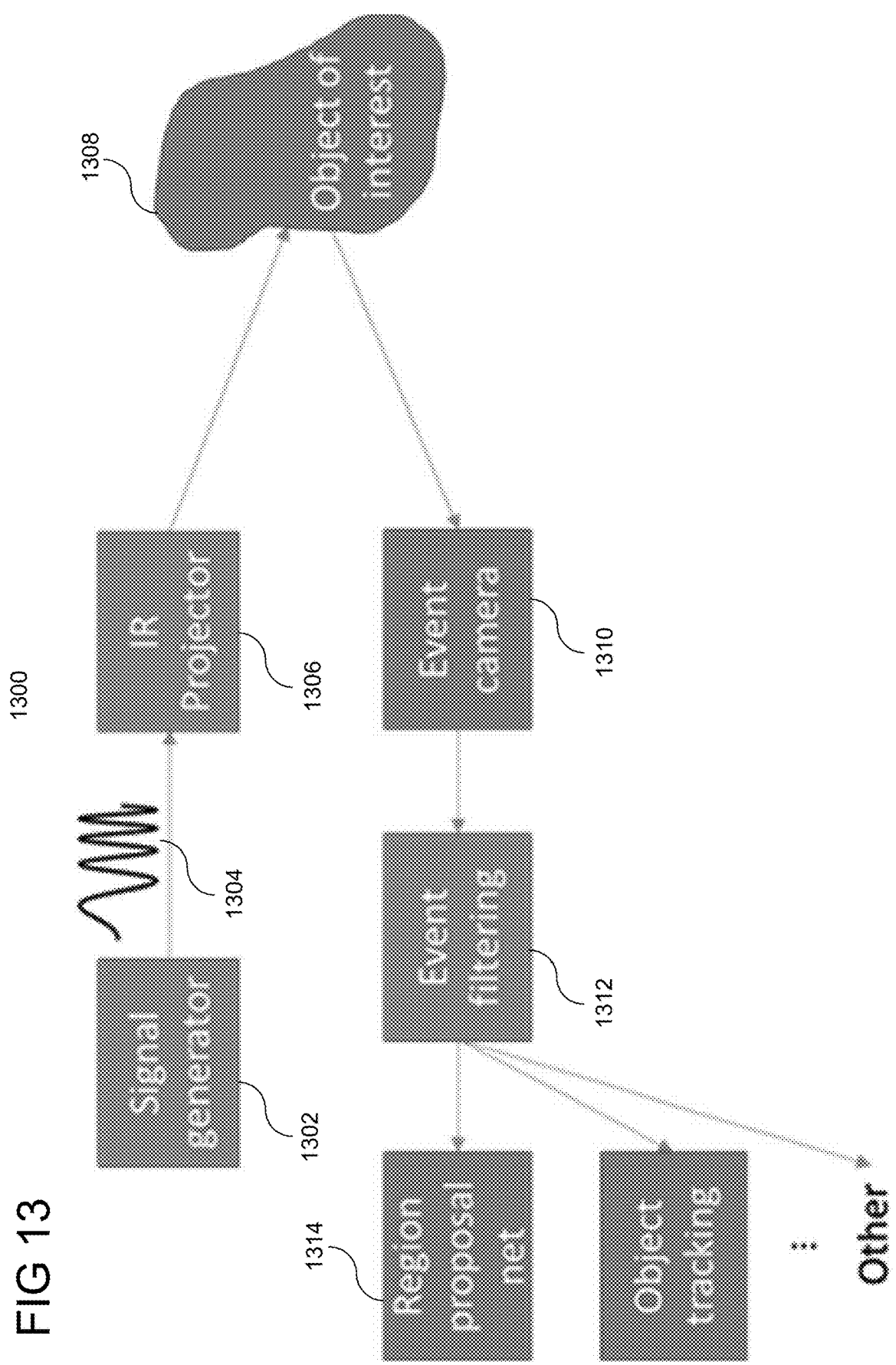
FIG. 13 shows an exemplary block diagram of an event filtering system according to some aspects.

FIG. 13 shows block diagram of a robust system 1300 for detection of objects according to some aspects. The system may include signal generator 1302, detectable signal 1304, IR projector 1306, Object of Interest 1308, Event-Based camera 1310, event filtering module 1312, and region proposal network 1314. Signal generator 1302 may be configurable to generate a signal at a detectable frequency. Signal 1304 is generated by signal generator 1302 at the configured frequency. Light source 1306 may be an infrared projector configured to produce light according to the frequency of signal 1304. Light source 1306 may be a laser diode, LIDAR, or some other appropriate device capable of projecting a time-varying pattern of one or multiple points at a sufficient distance from the source such as an ego-vehicle. Light source 1306 may illuminate object of interest 1308. Event-Based camera 1310 may detect or perceive an environment of an ego-vehicle. Event filtering module 1312 may process events generated by Event-Based camera 1310 to determine if the frequency of the light intensity associated with the event is substantially equal to the frequency of detectable signal 1304. If the frequency of the light intensity is substantially equal, event filtering module may input the event into region proposal network 1314 or any other classification network.

Event-bases cameras, such as camera 1310, asynchronously report logarithmic intensity changes related to the rate of photon arrival at individual pixels. The Event Based camera 1310 outputs a sequence of events, denoted by (x, y, t, σ), where, (x, y) are the image coordinates, t is the time stamp for the event and σ=±1 denotes the polarity, i.e., the increase or decrease of the intensity change at that pixel and time, given by equation (1):

$$\sigma = T\left(\log\left(\frac{Lxy(t)}{Lxy(t_{ref})}\right), c\right)$$

where T (*, *) is a truncation equation (2):

$$T(d,c) = +1, \text{ if } d \geq c, 0 \text{ if } d \in (-c,c), -1 \text{ if } d < c$$

Here, c is a threshold parameter determining whether an event should be recorded or not. Lxy(t) is the intensity at pixel (x, y) and $t_{ref}$ is the timestamp of a previous event. When an event is triggered, $Lxy(t_{ref})$ at that pixel is updated to a new intensity level.

Equations (1) and (2) mean that if intensity changes happen too fast, they will not generate events as there will be no time to reset the reference level. On the contrary, if intensity changes happen too slowly, no events will be generated because increments in intensity will be below the noise floor of the detector. Therefore, the frequency of the signal generator should be selected such that the resulting intensity changes can be captured. Sinusoidal signals with a frequency between 100 Hz and 300 Hz may be used to and detected by Event-Based camera 1310 to generate an event To make detectability of a signal more robust to external interference signals, a logarithmic or linear sweep, e.g., in the range 100-500 Hz, can be used instead of a simple sinusoidal.

Figure 14:
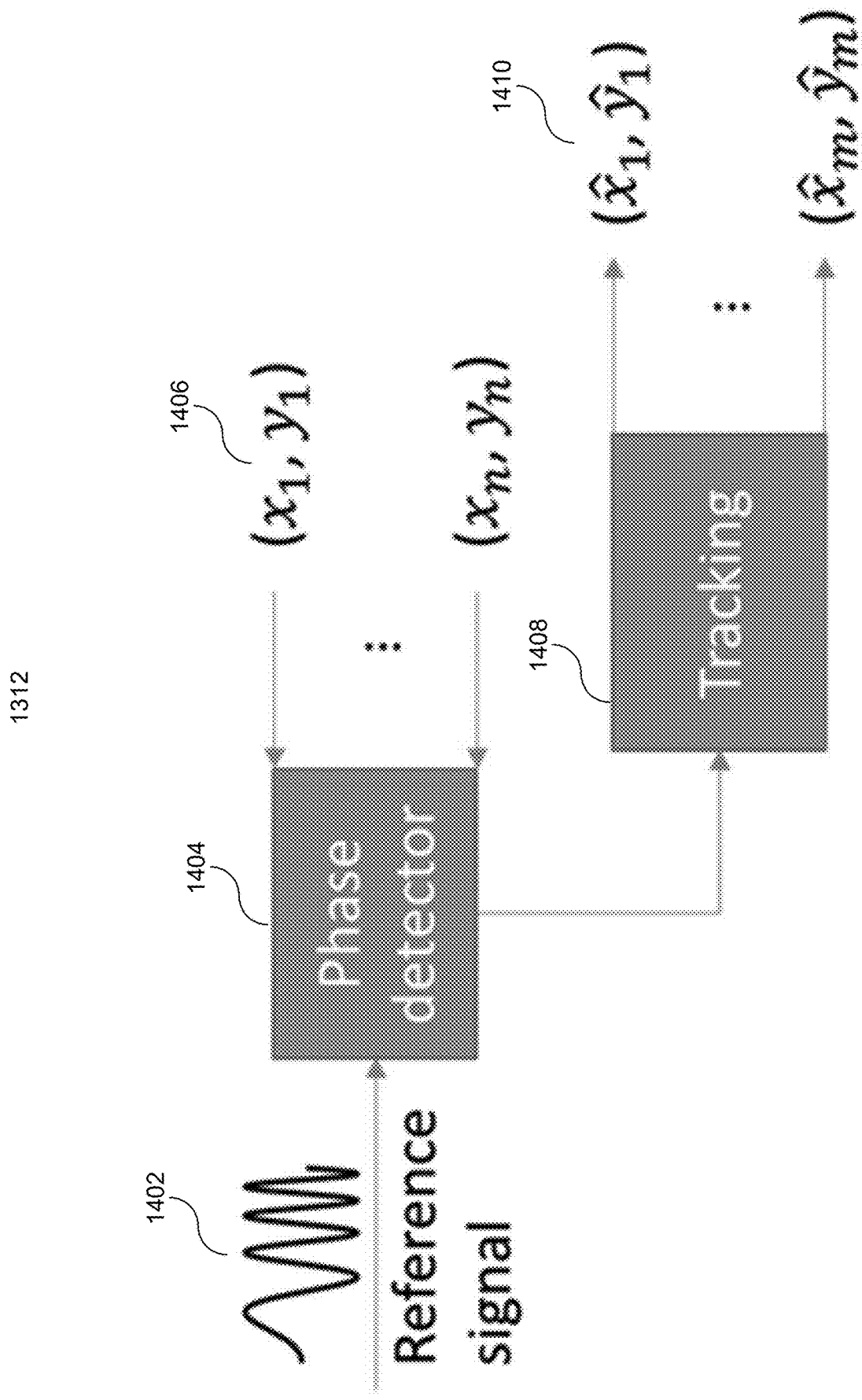
FIG. 14 shows an exemplary block diagram of an event filtering model according to some aspects.

FIG. 14 shows details of event filtering module 1312 according to some aspects. The phase detector module 1404 takes in as inputs reference signal 1402 and plurality of pixels 1406. Phase detector module 1404 selects camera pixels from a plurality of pixels 1406 matching the frequency of the reference signal 1402. Reference signal 1402 has substantially the same frequency as signal 1304. Phase detector 1404 removes unwanted specks of noise, such as noise 1106. Tracking module 1408 takes in as input the pixels selected by phase detector module 1404. Tracking module 1408 keeps track of past detections to output events associated with the frequency of the reference signal. Tracking module 1408 may involve distinct operations on groups of pixels such as morphological clustering, non-maximal suppression, etc. Tracking module 1408 outputs tracked events at known positions in the camera coordinate system, which can then be fused with other sensors and input into obstacle detection and avoidance systems.

Figure 15:
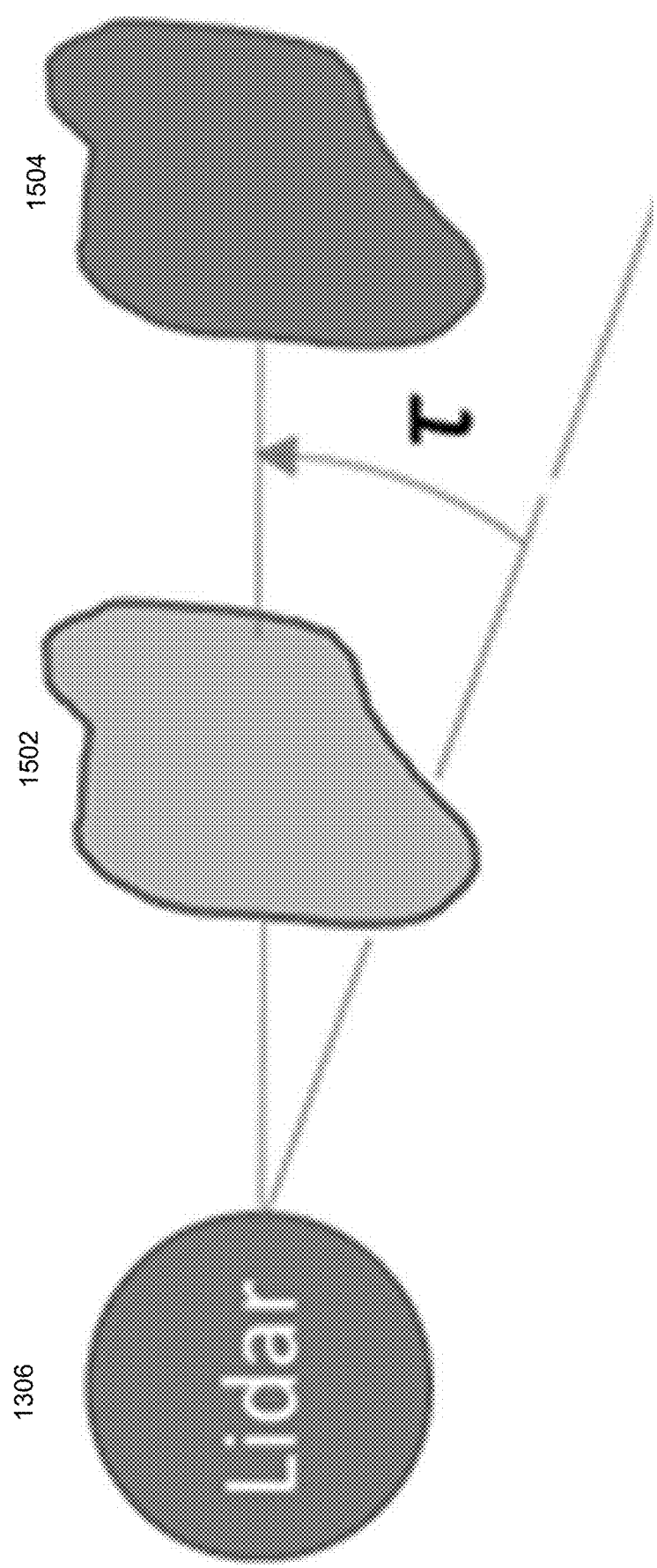
FIG. 15 shows an exemplary change in illumination frequency of an illumination source as a function of distance between the illumination source and an adversarial target according to some aspects.

FIG. 15 shows an light source 1306 according to some aspects. Light source 1306 may be a rotating or a solid state LIDAR. The illumination frequency of light source 1306 may be configured based on the distance of the illuminated object from the light source 1306. For example a different frequency may be chosen for object of interest 1502 as compared to object of interest 1504. Light source 1306 may be used to generate detectable events at DVS 1310. Signal generator 1302 modifies the temporal characteristics of the projected light from IR projector 1306 to create easily detectable signals that may take into account operating properties of DVS 1310.

Figure 16:
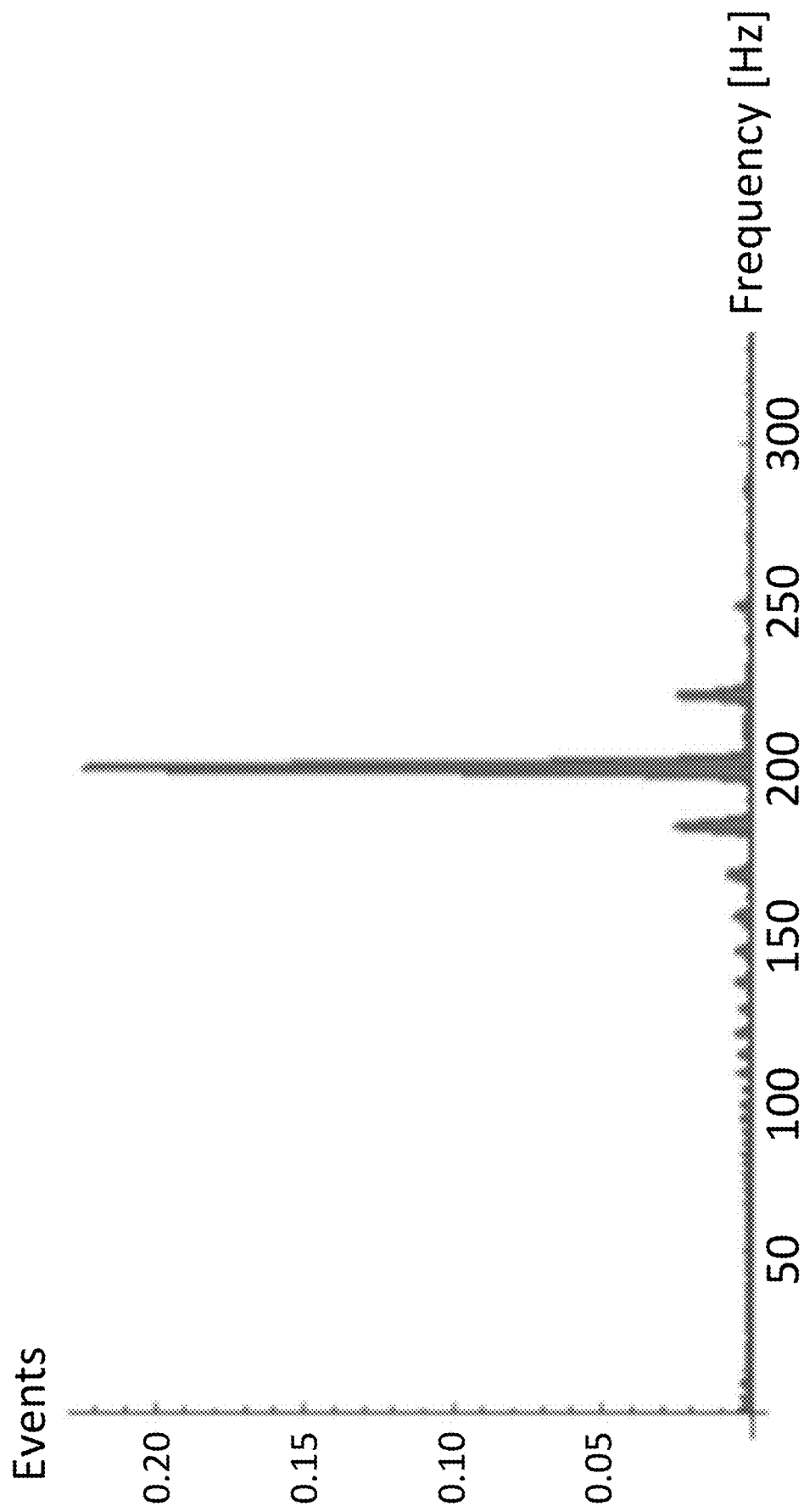
FIG. 16 shows an exemplary number of events detected by a dynamic vision sensor across a frequency range according to some aspects.

FIG. 16 shows an exemplary frequency response 1600 from a DVS sensor. When observing a loudspeaker illuminated with a red laser a strong signal is observed at the frequency of the vibrating source when the laser is on but disappears when the laser is off, while the source still vibrates. The converse case, when the target is static but the laser is modulated at an appropriate frequency was shown in FIG. 12 which corresponded with a strong response from a DVS.

FIG. 17 shows an exemplary method 1700 for calculating the time to contact of an adversarial object according to some aspects. Method 1700 includes obtaining at least one pixel of an image, wherein the pixel is associated with a change in light intensity 1702; determining a reference signal frequency associated with a transmitted light 1704; receiving the plurality of event data associated with a change in a light intensity of the at least one pixel, wherein the light intensity is associated with a light frequency 1706; identifying a select event data from the plurality of event data, wherein the light frequency associated with the select event data is substantially the same as the reference signal frequency 1708; filtering a filter event data from the plurality of event data, wherein the light frequency associated with the filter event data is not substantially the same as the reference signal frequency 1710; determining an object based on the at least one pixel, wherein the object is fully enclosed by a bounding box comprising coordinates of a rectangular border 1712; calculating a distance between a set of coordinates of the bounding box closest to the autonomous vehicle and the autonomous vehicle 1714; and Calculating the time to contact between the set of coordinates of the bounding box and the autonomous vehicle 1716.

In the following, various aspects of the present disclosure will be illustrated:

In Example 1, an event filtering device for filtering a plurality of event data, the device comprising one or more processors configured to: determine a reference signal frequency associated with a transmitted light; receive the plurality of event data associated with a change in a light intensity of a pixel, wherein the light intensity is associated with a light frequency; identify a select event data from the plurality of event data, wherein the light frequency associated with the select event data is substantially the same as the reference signal frequency; and filter a filter event data from the plurality of event data, wherein the light frequency associated with the filter event data is not substantially the same as the reference signal frequency.

In Example 2, the subject matter of Example(s) 1, includes to detect an object based on the select event data.

In Example 3, the subject matter of Example(s) 1 and 2, includes to store a plurality of filter event data and detect an object based on the stored event data.

In Example 4 the subject matter of Example(s) 1-3, includes a signal generator configured to generate the reference signal associated with the reference signal frequency.

In Example 5, the subject matter of Example(s) 1-4, includes a projection device, wherein the projection device is configured to project a varying light pattern according to the reference signal frequency.

In Example 6, the subject matter of Example(s) 1-5, includes the projection device comprising an illumination source.

In Example 7, the subject matter of Example(s) 1-6, includes the illumination source is a rotating LIDAR.

In Example 8, the subject matter of Example(s) 1-7, includes the illumination source is a solid state LIDAR.

In Example 9, the subject matter of Example(s) 1-8, includes the illumination source is an infrared projector.

In Example 10, the subject matter of Example(s) 1-9, includes the illumination source is a laser diode.

In Example 11, the subject matter of Example(s) 1-10, includes the pixel is part of a plurality of pixels of an image.

In Example 12, the subject matter of Example(s) 1-11, includes the image is generated by an event based camera.

In Example 13, the subject matter of Example(s) 1-12, includes to output image coordinates of the pixel.

In Example 14, the subject matter of Example(s) 1-13, includes the reference signal frequency is configurable.

In Example 15, the subject matter of Example(s) 1-14, includes the reference signal frequency is based on a distance of an illuminated object from the illumination source.

In Example 16, the subject matter of Example(s) 1-15, includes the reference signal frequency is between 100 Hz and 300 Hz.

In Example 17, the subject matter of Example(s) 1-16, includes a light frequency range, wherein the reference signal frequency is in the light frequency range.

In Example 18, the subject matter of Example(s) 1-17, includes to determine that the light frequency is associated with the track event is within the light frequency range.

In Example 19, the subject matter of Example(s) 1-18, includes a light intensity threshold.

In Example 20, the subject matter of Example(s) 1-19, includes each light intensity associated satisfies the light intensity threshold.

In Example 21, the subject matter of Example(s) 1-20, includes each pixel associated with the stored event data is adjacent to at least one other pixel associated with the stored event data.

In Example 22, the subject matter of Example(s) 1-21, includes each pixel associated with the stored event data is associated with an adversarial target.

In Example 23, a method for filtering a plurality of event data, the method comprising: determining a reference signal frequency associated with a transmitted light; receiving the plurality of event data associated with a change in a light intensity of a pixel, wherein the light intensity is associated with a light frequency; identifying a select event data from the plurality of event data, wherein the light frequency associated with the select event data is substantially the same as the reference signal frequency; and filtering a filter event data from the plurality of event data, wherein the light frequency associated with the filter event data is not substantially the same as the reference signal frequency.

In Example 24, the subject matter of Example(s) 23, includes detecting an object based on the select event data.

In Example 25, the subject matter of Example(s) 23 and 24, includes storing a plurality of filter event data and detecting an object based on the stored event data.

In Example 26, the subject matter of Example(s) 23-25, includes generating the reference signal associated with the reference signal frequency.

In Example 27, the subject matter of Example(s) 23-26, includes projecting a varying light pattern according to the reference signal frequency.

In Example 28, the subject matter of Example(s) 23-27, includes the projection is associated with an illumination source.

In Example 29, the subject matter of Example(s) 23-28, includes the illumination source is a rotating LIDAR.

In Example 30, the subject matter of Example(s) 23-29, includes the illumination source is a solid state LIDAR.

In Example 31, the subject matter of Example(s) 23-30, includes the illumination source is an infrared projector.

In Example 32, the subject matter of Example(s) 23-31, includes the illumination source is a laser diode.

In Example 33, the subject matter of Example(s) 23-32, includes the pixel is part of a plurality of pixels of an image.

In Example 34, the subject matter of Example(s) 23-33, includes the image is generated by an event based camera.

In Example 35, the subject matter of Example(s) 23-34, includes outputting image coordinates of the pixel.

In Example 36, the subject matter of Example(s) 23-35, includes the reference signal frequency is configurable.

In Example 37, the subject matter of Example(s) 23-36, includes the reference signal frequency is based on a distance of an illuminated object from the illumination source.

In Example 38, the subject matter of Example(s) 23-37, includes the reference signal frequency is between 100 Hz and 300 Hz.

In Example 39, the subject matter of Example(s) 23-38, includes a light frequency range, wherein the reference signal frequency is in the light frequency range.

In Example 40, the subject matter of Example(s) 23-39, includes to determine that the light frequency is associated with the track event is within the light frequency range.

In Example 41, the subject matter of Example(s) 23-40 includes a light intensity threshold.

In Example 42, the subject matter of Example(s) 23-41, includes each light intensity associated satisfies the light intensity threshold.

In Example 43, the subject matter of Example(s) 23-42, includes each pixel associated with the stored event data is adjacent to at least one other pixel associated with the stored event data.

In Example 44, the subject matter of Example(s) 23-43, includes each pixel associated with the stored event data is associated with an adversarial target.

In Example 45, one or more non-transitory computer readable media comprising programmable instructions thereon, that when executed by one or more processors of a device, cause the device to perform any one of the method of Example(s) 23-45.

In Example 46, a system comprising one or more devices according to any of Example(s) 1-22, the system configured to implement a method according to any of Example(s) 23-45.

In Example 47, a means for implementing any of the Example(s) 1-22.

In Example 48, a device configured to calculate a time to contact for an autonomous vehicle, the device comprising one or more processors configured to: obtaining at least one pixel of an image, wherein the pixel is associated with a change in light intensity; determine an object based on the at least one pixel, wherein the object is fully enclosed by a bounding box comprising coordinates of a rectangular border; calculate a distance between a set of coordinates of the bounding box closest to the autonomous vehicle and the autonomous vehicle; and calculate the time to contact between the set of coordinates of the bounding box and the autonomous vehicle.

In Example 49, the subject matter of Example(s) 48, includes the one or more processors are further configured to implement a feature extraction model to determine the object.

In Example 50, the subject matter of Example(s) 48 and 49, includes the feature extraction model is convolutional neural network.

In Example 51, the subject matter of Example(s) 48-50, includes the convolutional neural network further comprises a probabilistic model.

In Example 52, the subject matter of Example(s) 48-51, includes the convolutional neural network generates a probability of the determined object.

In Example 53, the subject matter of Example(s) 48-52, includes a Dynamic Vision configured to detect a change in light intensity.

In Example 54, the subject matter of Example(s) 48-53, includes the Dynamic Vision Sensor is an Event Based Camera.

In Example 55, the subject matter of Example(s) 48-54, includes a frame rate of a sensor of the Event Based Camera is configurable.

In Example 56, the subject matter of Example(s) 48-55, includes the frame rate is 60 frames per second.

In Example 57, the subject matter of Example(s) 48-56, includes to determine the distance between the autonomous vehicle and an edge of the bounding box.

In Example 58, the subject matter of Example(s) 48-57, includes to determine the time to contact between the autonomous vehicle and a point of the bounding box based on a velocity of the autonomous vehicle.

In Example 59, the subject matter of Example(s) 48-58, includes to determine the time to contact based on an acceleration of the autonomous vehicle.

In Example 60, the subject matter of Example(s) 48-59, includes the object is a foreground object relative to the autonomous vehicle.

In Example 61, the subject matter of Example(s) 48-60, includes the convolutional neural network is configured to receive two channels of event frames.

In Example 62, the subject matter of Example(s) 48-61, includes the two channels of event frames comprise a negative channel and a positive channel.

In Example 63, the subject matter of Example(s) 48-62, includes the convolutional neural network is configured to not compute at least one convolutional layer.

In Example 64, the subject matter of Example(s) 48-63, includes the feature extraction module further comprises a region proposal network.

In Example 65, the subject matter of Example(s) 48-64, includes to generate an object proposal.

In Example 66, the subject matter of Example(s) 48-65, includes the object proposal is input into a region of interest extraction.

In Example 67, the subject matter of Example(s) 48-66, includes to transform the region of the image.

In Example 68, the subject matter of Example(s) 48-67, includes the transformation of the region of interest is a warping function.

In Example 69, a method for calculating a time to contact of an autonomous vehicle, the method comprising: obtaining at least one pixel of an image, wherein the pixel is associated with a change in light intensity; determining an object based on the at least one pixel, wherein the object is fully enclosed by a bounding box comprising coordinates of a rectangular border; calculating a distance between a set of coordinates of the bounding box closest to the autonomous vehicle and the autonomous vehicle; and calculating the time to contact between the set of coordinates of the bounding box and the autonomous vehicle.

In Example 70, the subject matter of Example(s) 69, includes implementing a feature extraction model to determine the object.

In Example 71, the subject matter of Example(s) 69 and 70, includes the feature extraction model is convolutional neural network.

In Example 72, the subject matter of Example(s) 68-71, includes the convolutional neural network further comprises a probabilistic model.

In Example 73, the subject matter of Example(s) 68-72, includes generating a probability of the determined object.

In Example 74, the subject matter of Example(s) 68-73, includes detecting a change in light intensity.

In Example 75, the subject matter of Example(s) 68-74, includes the detection further comprises generating an event data.

In Example 76, the subject matter of Example(s) 68-75, includes a frame rate associated with the detection is configurable.

In Example 77, the subject matter of Example(s) 68-76, includes the frame rate is 60 frames per second.

In Example 78, the subject matter of Example(s) 68-77, includes determining the distance between the autonomous vehicle and an edge of the bounding box.

In Example 79, the subject matter of Example(s) 68-78, includes determining the time to contact between the autonomous vehicle and a point of the bounding box based on a velocity of the autonomous vehicle.

In Example 80, the subject matter of Example(s) 68-79, includes determining the time to contact based on an acceleration of the autonomous vehicle.

In Example 81, the subject matter of Example(s) 68-80, includes the object is a foreground object relative to the autonomous vehicle.

In Example 82, the subject matter of Example(s) 68-81, includes the convolutional neural network is configured to receive two channels of event frames.

In Example 83, the subject matter of Example(s) 68-82, includes the two channels of event frames comprise a negative channel and a positive channel.

In Example 84, the subject matter of Example(s) 68-83, includes the convolutional neural network is configured to not compute at least one convolutional layer.

In Example 85, the subject matter of Example(s) 68-84, includes the feature extraction module further comprises a region proposal network.

In Example 86, the subject matter of Example(s) 68-85, includes generating an object proposal.

In Example 87, the subject matter of Example(s) 68-86, includes the object proposal is input into a region of interest extraction.

In Example 88, the subject matter of Example(s) 68-87, includes transforming the region of the image.

In Example 89, the subject matter of Example(s) 68-88, includes the transformation of the region of interest is a warping function.

In Example 90, one or more non-transitory computer readable media comprising programmable instructions thereon, that when executed by one or more processors of a device, cause the device to perform any one of the method of Example(s) 69-89.

In Example 91, a system comprising one or more devices according to any of Example(s) 48-68, the system configured to implement a method according to any of Example(s) 69-89.

In Example 92, a means for implementing any of the Example(s) 48-68.

In Example 93, a method for calculating a time to contact of an autonomous vehicle, the method comprising: obtaining at least one pixel of an image, wherein the pixel is associated with a change in light intensity; determining a reference signal frequency associated with a transmitted light; receiving the plurality of event data associated with a change in a light intensity of the at least one pixel, wherein the light intensity is associated with a light frequency; identifying a select event data from the plurality of event data, wherein the light frequency associated with the select event data is substantially the same as the reference signal frequency; filtering a filter event data from the plurality of event data, wherein the light frequency associated with the filter event data is not substantially the same as the reference signal frequency; determining an object based on the at least one pixel, wherein the object is fully enclosed by a bounding box comprising coordinates of a rectangular border; calculating a distance between a set of coordinates of the bounding box closest to the autonomous vehicle and the autonomous vehicle; and calculating the time to contact between the set of coordinates of the bounding box and the autonomous vehicle.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A system for filtering a plurality of event data, the system comprising:
    a light source configured to emit towards a scene a transmitted light modulated by a reference signal frequency; and
    one or more processors configured to:
        obtain the reference signal frequency;
        receive the plurality of event data, each comprising a change in a light intensity of a pixel, wherein the pixel is part of an image of the scene reflecting the transmitted light;
        determine, for each event data in the plurality of event data, a frequency of the change in the light intensity of the pixel over time;
        identify a select event data from the plurality of event data based on whether the frequency of the change in the light intensity of the pixel is substantially the same as the reference signal frequency; and
        filter a filter event data from the plurality of event data based on whether the frequency of change in the light intensity of the pixel is not substantially the same as the reference signal frequency.

2. The system of claim 1, wherein the one or more processors are further configured to detect an object within the scene based on the select event data.

3. The system of claim 1, wherein the one or more processors are further configured to store a plurality of filter event data and detect an object based on the stored event data.

4. The system of claim 1, wherein the one or more processors are further configured to output image coordinates of the pixel.

5. The system of claim 1, wherein the one or more processors are further configured to determine the reference signal frequency is-based on a distance of an illuminated object from the light source.

6. A method for filtering a plurality of event data, the method comprising:
    emitting towards a scene a transmitted light modulated by a reference signal frequency;
    receiving the plurality of event data, each comprising a change in a light intensity of a pixel, wherein the pixel is part of an image of the scene reflecting the transmitted light;
    determining, for each event data in the plurality of event data, a frequency of the change in the light intensity of the pixel over time;
    identifying a select event data from the plurality of event data based on whether the frequency of the change in the light intensity is substantially the same as the reference signal frequency; and
    filtering a filter event data from the plurality of event data based on whether the frequency of the change in the light intensity is not substantially the same as the reference signal frequency.

7. The method of claim 6, the method further comprising storing a plurality of filter event data and detecting an object based on the stored event data.

8. A device configured to calculate a time to contact for an autonomous vehicle, the device comprising one or more processors configured to:
    obtain a reference signal frequency of a transmitted light that has been modulated by the reference signal frequency and emitted toward a scene;
    obtain a change in a light intensity of at least one pixel, wherein the at least one pixel is part of an image of the scene reflecting the transmitted light;
    determine a frequency of the change in the light intensity of the at least one pixel over time;
    determine an object based on the at least one pixel and based on a comparison between the reference signal frequency and the frequency of the change in the light intensity, wherein the object is defined by a fully enclosed bounding box comprising coordinates of a rectangular border;
    calculate a distance between a set of coordinates of the bounding box closest to the autonomous vehicle and the autonomous vehicle;
    calculate the time to contact between the set of coordinates of the bounding box and the autonomous vehicle; and
    control a movement of the autonomous vehicle based on the time to contact.

9. The device of claim 8, wherein the one or more processors are further configured to implement a feature extraction model to determine the object.

10. The device of claim 9, wherein the feature extraction model is a convolutional neural network.

11. The device of claim 10, wherein the convolutional neural network further comprises a probabilistic model.

12. The device of claim 11, wherein the convolutional neural network generates a probability of the determined object.

13. The device of claim 8, the device further comprising a dynamic vision sensor configured to detect the change in the light intensity of the at least one pixel.

14. The device of claim 8, wherein the one or more processors are further configured to determine the distance between the autonomous vehicle and an edge of the bounding box.

15. The device of claim 14, wherein the one or more processors are further configured to determine the time to contact between the autonomous vehicle and a point of the bounding box based on a velocity of the autonomous vehicle.

16. The device of claim 8, wherein the object is a foreground object relative to the autonomous vehicle.

* * * * *